(12) United States Patent
Po et al.

(10) Patent No.: US 8,798,137 B2
(45) Date of Patent: Aug. 5, 2014

(54) BIT RATE ESTIMATION IN DATA OR VIDEO COMPRESSION

(75) Inventors: Lai-Man Po, Hong Kong (CN); Mohammed Golam Sarwer, Hong Kong (CN)

(73) Assignee: City University of Hong Kong, Kowloon (HK)

( * ) Notice: Subject to any disclaimer, the term of this patent is extended or adjusted under 35 U.S.C. 154(b) by 1325 days.

(21) Appl. No.: 12/039,904

(22) Filed: Feb. 29, 2008

(65) Prior Publication Data

US 2009/0219991 A1    Sep. 3, 2009

(51) Int. Cl.
*H04N 7/12* (2006.01)

(52) U.S. Cl.
USPC ............. 375/240.02; 375/240.12; 375/240.24

(58) Field of Classification Search
USPC .......................................... 375/240.2, 240.26
See application file for complete search history.

(56) References Cited

U.S. PATENT DOCUMENTS

| | | | | |
|---|---|---|---|---|
| 6,035,126 | A * | 3/2000 | Wise et al. | 712/29 |
| 6,091,777 | A * | 7/2000 | Guetz et al. | 375/240.11 |
| 7,088,780 | B2 * | 8/2006 | Vetro et al. | 375/240.02 |
| 7,113,115 | B2 * | 9/2006 | Partiwala et al. | 341/67 |
| 7,224,844 | B2 * | 5/2007 | Otsuka | 382/239 |
| 7,283,589 | B2 * | 10/2007 | Cai et al. | 375/240.26 |
| 7,378,992 | B2 * | 5/2008 | Fallon | 341/51 |
| 7,471,841 | B2 * | 12/2008 | Wu et al. | 382/245 |
| 7,884,742 | B2 * | 2/2011 | Puri et al. | 341/67 |
| 8,018,850 | B2 * | 9/2011 | van Beek et al. | 370/232 |
| 8,208,548 | B2 * | 6/2012 | Nagaraj et al. | 375/240.16 |
| 8,275,045 | B2 * | 9/2012 | Ye et al. | 375/240.23 |
| 8,565,301 | B2 * | 10/2013 | Tian et al. | 375/240.05 |
| 2006/0133478 | A1 * | 6/2006 | Wen | 375/240.03 |
| 2007/0121728 | A1 * | 5/2007 | Wang et al. | 375/240.18 |
| 2008/0101476 | A1 * | 5/2008 | Tian et al. | 375/240.26 |
| 2009/0238271 | A1 * | 9/2009 | Kim et al. | 375/240.12 |
| 2009/0323803 | A1 * | 12/2009 | Gomila et al. | 375/240.02 |

OTHER PUBLICATIONS

Sarwer and Po, "Fast Bit Rate Estimation for Mode Decision of H.264/AVC", IEEE, Oct. 2007.*
T. Wiegand, "Editor's Proposed Draft Text Modifications for Joint Video Specification (ITU-T Rec. H.264 | ISO/IEC 14496-10 AVC)", Joint Video Team (JVT) of ISO/IEC MPEG and ITU-T VCEG, 4th Meeting: Klagenfurt, Austria, (Jul. 22-26, 2002).
G. Sullivan et al., "Rate-Distortion Optimization for Video Compression", IEEE Signal Processing Magazine, pp. 74-90, (Nov. 1998).
Y. Tu et al., "Efficient Rate-Distortion Estimation for H.264/AVC Coders", IEEE Transactions on Circuits and Systems for Video Tech., Vo. 16, No. 5, pp. 600-611, (May 2006).
T. Chiang et al., "A New Rate Control Scheme Using Quadratic Rate Distortion Model", IEEE Trans. on Circuits & Systems for Video Tech., vol. 7, No. 1, pp. 246-250, (Feb. 1997).

(Continued)

Primary Examiner — Brian O'Connor
(74) Attorney, Agent, or Firm — Leydig, Voit & Mayer, Ltd.

(57) ABSTRACT

To reduce the complexity of rate-distortion cost computation in AVC (MPEG4 Part2/H.264), a bit rate estimation method is used to avoid entropy coding during Intra and Inter mode decision. The bit rate estimation method predicts the number of entropy coded bits based on the quantized transform coefficients, thus avoiding the need to entropy code the quantized transform coefficients at each decision iteration.

14 Claims, 41 Drawing Sheets

(56) References Cited

OTHER PUBLICATIONS

C. Tseng et al., "Enhanced Intra-4 x 4 Mode Decision for H.264/AVC Coders", IEEE Trans. on Circuits & Systems for Video Tech., vol. 16, No. 8, pp. 1027-1032 (Aug. 2006).

Z. Chen et al., "Fast Integer Pel and Fractional Pel Motion Estimation for JVT", Joint Video Team (JVT) Docs, JVT-F017, (Dec. 2002).

S. Gordon, "Simplified Use of 8x8 Transforms", Joint Video Team (JVT) of ISO/IEC MPEG & ITU-T VCEG (ISO/IEC JTC1/SC29/WG11 and ITU-T SG 16 Q.6) Doc. JVT-1022, (Sep. 2003).

P. Topiwala et al., "Performance evaluation of H.26L TML 8 vs. H.263++ and MPEG4," Document VCEG-O42, 15th Meeting, ITU-T Q.6/SG16, Video Coding Experts Group, Pattaya, Thailand, (Dec. 2001).

B. Erol et al., "The H.263+ video coding standard: complexity and performance," in: IEEE Data Compression Conference, Snowbird, Utah, pp. 259-268, (Mar. 1998).

C. Kim, "Fast H.264 Intra-prediction mode selection using joint spatial and transform domain features," J. Vis. Commun. & Image Representation, vol. 17, pp. 291-310, (2006).

C. Yang et al., "A fast H.264 Intra Prediction algorithm using Macroblock Properties," pp. 461-464, ICIP-2004.

F. Pan, et al.,"Fast Mode Decision Algorithm for Intraprediction in H.264/AVC Video Coding," IEEE Trans. Circuits Syst. Video Tech., vol. 15, No. 7, pp. 813-822, (Jul. 2005).

Joint Video Team ( JVT) reference software version 8.3, http://iphome.hhi.de/suchring/tml/download/old_jm/.

I. E. G. Richardson, H.264 and MPEG-4 Video Compression—video coding for next generation multimedia, John Wiley & Sons, pp. 198-207, (2003).

J. Ribas-Coebera, "Rate control of DCT video coding for low-delay communication," IEEE Trans. Circuits Syst. Video Tech., vol. 9, No. 1, pp. 172-185, (Feb. 1999).

K. P. Lim et al., "Fast inter mode selection," Joint Video Team (JVT) Docs, JVT-I020, (Sep. 2003).

D. Wu et al.,"Fast inter mode Decision in H.264/AVC Video Coding," IEEE Trans. Circuits Syst. Video Tech., vol. 15, No. 6, pp. 953-958, (Jul. 2005).

K. H. Han et al., "Fast macroblock mode determination to reduce H.264 complexity," IEICE Trans. Fundamentals, vol. E88-A, No. 3, pp. 800-804, (Mar. 2005).

T. Weigand et al., "Rate-constrained coder control and comparison of video coding standards," IEEE Trans. Circuits Syst. Video Tech., vol. 13, No. 7, pp. 688-703, (Jul. 2003).

\* cited by examiner

BIT RATE ESTIMATION IN DATA OR VIDEO COMPRESSION

BACKGROUND OF THE INVENTION

1. Field of the Invention

The current invention relates to a method of bite rate estimation in data or video compression, and in particular, but not exclusively, to a method of bit rate estimation for rate distortion (RD) optimization. The invention also relates variable length coding (VLC) and more particular to context-based variable length coding (CAVLC) and to Advanced Video Coding (AVC), also known as MPEG4-part 10 and H.264.

2. Background Information

The Motion Picture Experts Group (MPEG) is responsible for the MPEG series of data compression technologies, i.e. MPEG1, MPEG2 and MPEG4, which gave rise to MP3, VCDs and DVDs and revolutionized audio and visual distribution. Separately, the ITU-T Video Coding Experts Group (VCEG) developed the ITU-T H.263 standard for video compression that is widely used in videoconferencing systems. However, the appearance and development of various new multimedia services such as internet-based video applications gave rise to the need for even higher coding efficiency and in 2001 the two groups formed a Joint Video Team (JVT) to develop a new "international" standard for low bit rate visual communications. The result is the Advanced Video Coding (AVC) standard, which is actually two jointly maintained and identical standards MPEG4 Part 10 (ISO/IEC 14496-10) and ITU-T H.264. The entire contacts of the AVC standards, i.e. MPEG4 Part 10 and ITU-T H.264, are incorporated herein by reference. Further information on the Standard can also be found in "H.264 and MPEG-4 Video Compression—video coding for next generation multimedia" by Iain E. G. Richardson and published by John Wily & Sons in 2003 (ISBN: 978-0-470-84837-1).

Like earlier MPEG standards AVC does not define an encoder or decoder, but defines the syntax of an encoded video bitstream together with a method of decoding the bitstream, however a typical AVC compliant encoder may look that illustrated in FIG. 1. This encoder has four basic functional elements of prediction, transform, quantization and entropy encoding in common with other MPEG standards, but the details of each functional element has changed. New and advanced techniques are introduced in the AVC standard include intra prediction for 1-frame encoding, multi-frames inter prediction, small block-size transform coding, context-adaptive arithmetic entropy coding, de-blocking filtering, flexible macroblock ordering (FMO) and arbitrary slice ordering (ASO), etc. These advanced techniques provide good video quality at substantially lower bit rates than previous standards, and in particular up to 50% lower bit rate than MPEG-2, H.263, or MPEG-4 Part 2.

The following is a brief description of AVC encoding with reference to FIG. 1. The skilled addressee should be knowledgeable in video compression and in particular video compression using the AVC standard.

The encoder processes a current frame in sub-frame units called macroblocks, which correspond to a 16×16 pixel block of the frame (AVC also allows a frame to be divided into up to 8 slice groups, which comprises a sequence of macroblocks, and which may also be divided into a series of individual slices). For each processed macroblock the encoder forms a prediction macroblock, which is either based on a previously coded and reconstructed macroblock from within the current frame, known as intra prediction, or on a previous frame that has already been coded, known as inter prediction. The encoder subtracts the prediction macroblock from the current macroblock to produce a difference macroblock. The difference macroblock is transformed using a block transform and quantized to give a set of quantized transform coefficients. The transform coefficients are combined with other information required to decode the macroblock, such as the prediction mode used, the quantizer step size, motion vector information etc and the all the information is then compressed using an entropy encoding technique such as CAVLC to form a compressed bitstream which can transmitted over a network or stored for future retrieval.

To enable more accurate prediction, and hence more efficient and better quality compression, AVC provides more flexible prediction methods than previous ITU or MPEG standards. Intra prediction can use 4×4, 8×8 or 16×16 block sizes to predict a macroblock from a previously coded block within the same frame: There are a total of 9 prediction modes available for a 4×4 block, and 4 prediction modes available for each of a 8×3 and 16×16 block. Inter prediction uses a tree structured motion compensation which provides four different block sizes 16×6 16×8, 8×16, 8×8, each of which can be further sub-partitioned in 8×8, 8×4, 4×8 or 4×4 blocks giving rise to a large number of possible block combinations within each macroblock.

To achieve the highest coding efficiency AVC also uses a rate-distortion (RD) optimization technique to get the best coding result in terms of maximizing coding quality and minimizing bit rates. This means that the encoder has to code each macroblock by exhaustively trying all the mode combinations including the different intra and inter prediction modes and all entropy coding techniques. When a macroblock is in an I-slice it can be coded using intra prediction meaning the RD algorithm must search the 17 Intra prediction modes. When a macroblock is in a P-slice it can be coded using either Intra prediction or Inter prediction and must search all Intra and Inter prediction modes. Therefore, the complexity and computation load of video coding in AVC increase drastically compared to any previous standards.

SUMMARY OF THE INVENTION

In view of the above, it is an object of the present invention to provide a method of ameliorating the complexity of rate distortion optimization in an AVC standard encoder. It is a further object of the present invention to provide a method of bite rate estimation in data or video compression, and in particular, but not exclusively, in CAVLC, or at least to provide the public with a useful alternative.

To reduce the complexity of rate-distortion cost computation in AVC a bit rate estimation method is disclosed herein that avoids entropy coding during the Intra and Inter mode decision. The bit rate estimation method predicts the number of entropy coded bits based on the quantized transform coefficients, thus avoiding the need to entropy code the quantized transform coefficients at each decision iteration.

The bit rate estimation method is based on properties of context-based variable length coding (CAVLC). The method predicts the bit rate of a 4×4 quantized residual block using five different tokens of CAVLC. The total number of bits need to encode a quantized residual block is predicted by estimating the rate of each symbol of CAVLC separately.

Further aspects of the invention will become apparent from the following description.

BRIEF DESCRIPTION OF THE DRAWINGS

An exemplary form of the present invention will now be described by way of example only and with reference to the accompanying drawings, in which.

DESCRIPTION OF THE EXEMPLARY EMBODIMENTS

Figure 1:
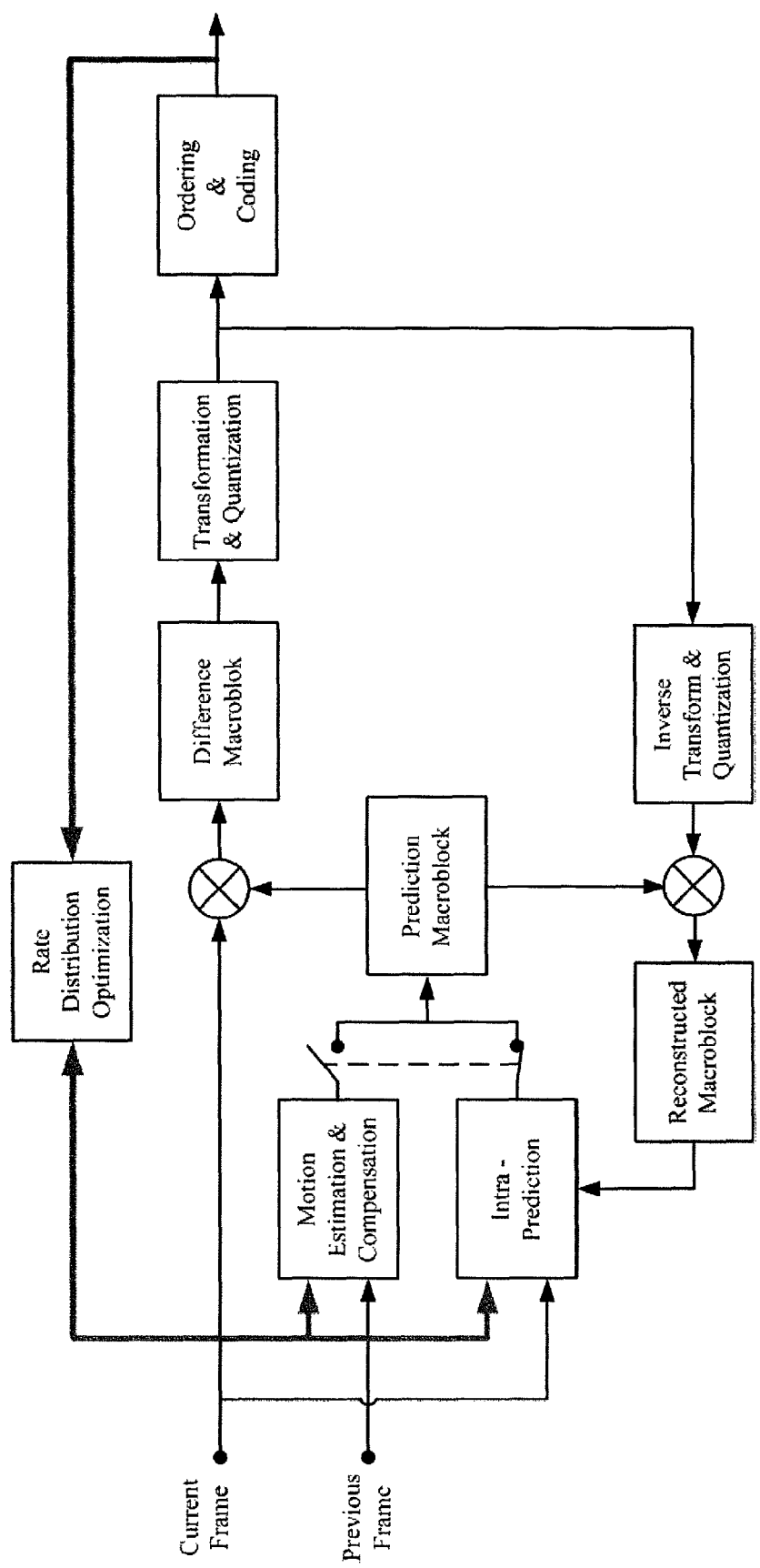
FIG. 1 schematically illustrates an AVC compliant encoder as is common in the art, FIG. 2 schematically illustrates an encoder having bit rate estimation according to the invention.
Figure 2:
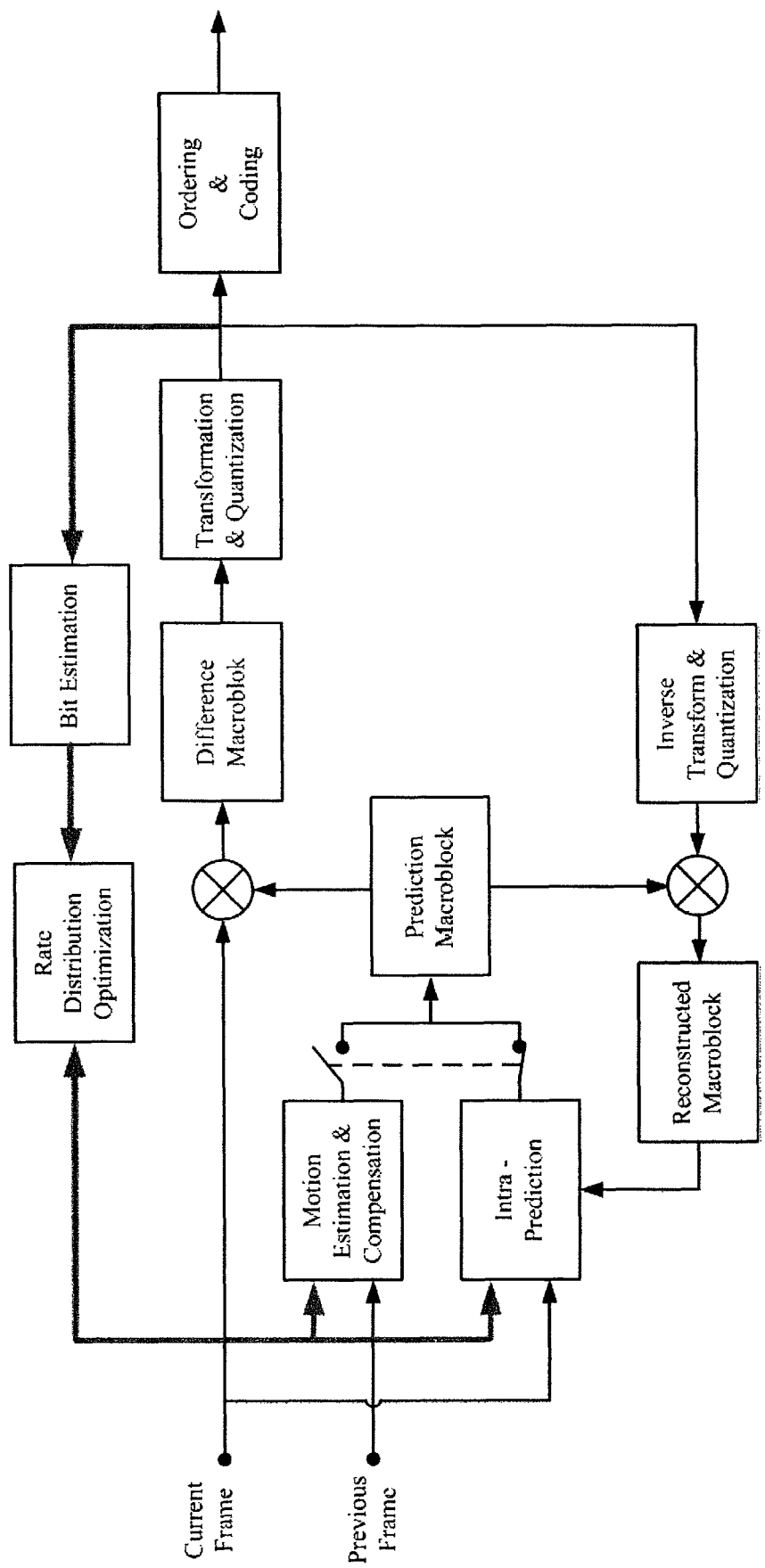
Figure 3:
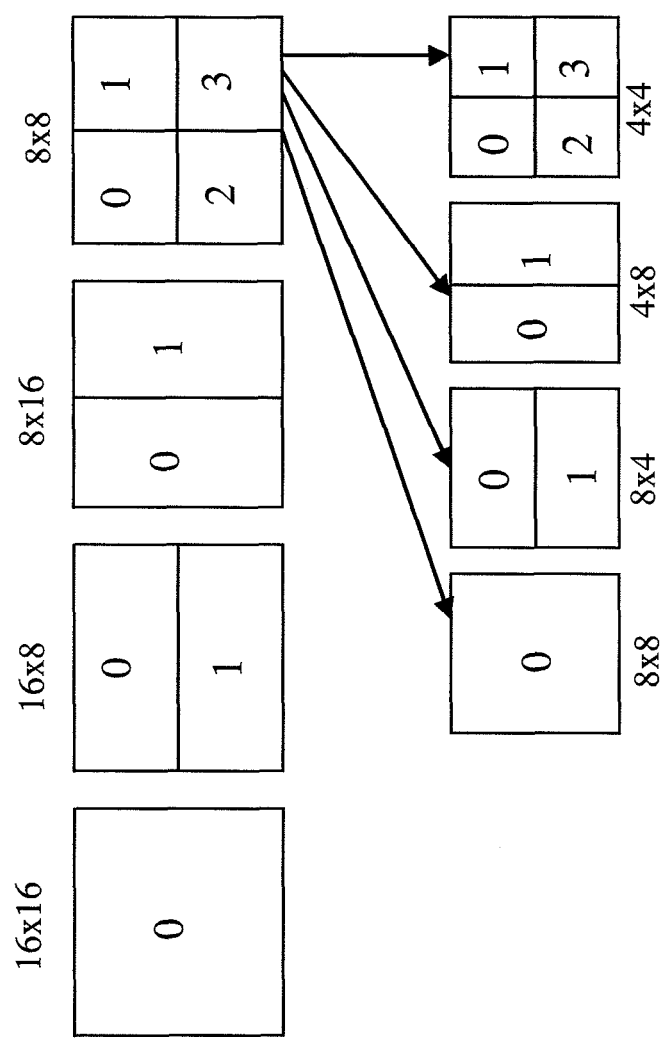
FIG. 3 is a block diagram showing variable block sizes of macroblock of INTER mode.
Figure 4:
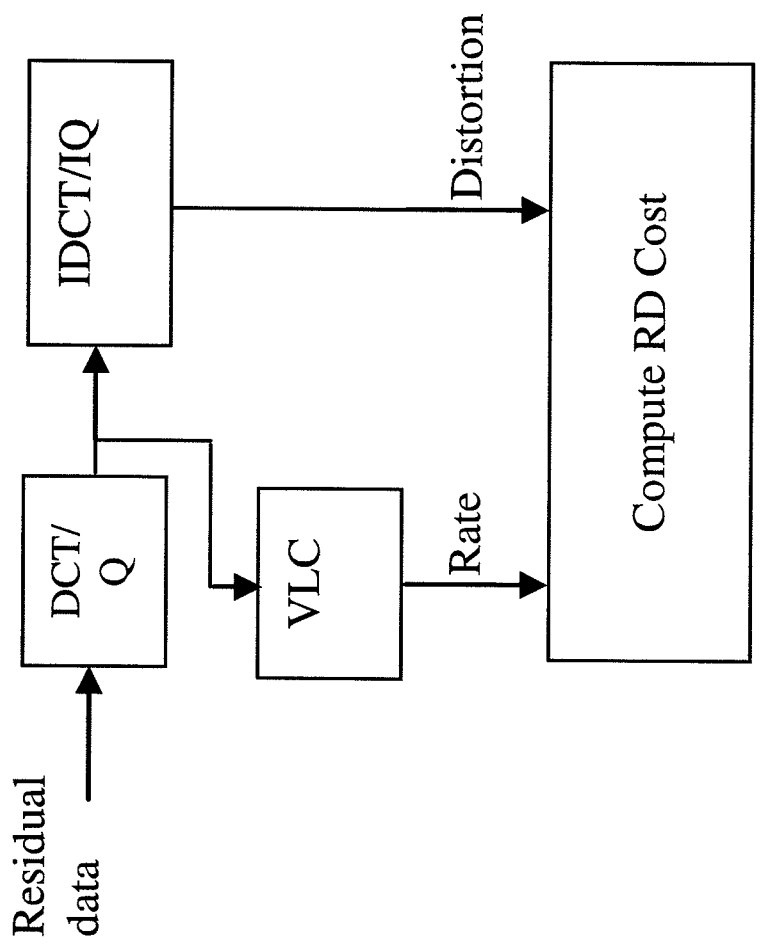
FIG. 4 is a block diagram showing the computation of RD cost.

Embodiments of the present invention are described in the papers "Mohammed Golam Sarwer, and Lai Man Po, "*Bit Rate estimation for cost function of 4×4 intra mode decision of H.264/AVC.*" Proceeding of IEEE International Conference on Multimedia and Expo (ICME 2007), pp-1579-1582." and "Mohammed Golam Sarwer, and Lai Man Po "*Fast bit rate estimation for mode decision of H.264/AVC*" IEEE Transaction of Circuit and System for Video Technology, volume 17, number 10, Octover 2007, pp 1402-1407.", the entire contents of which are incorporated herein by reference.

A further embodiment of the bit rate estimation method of the invention will now be described as practiced in a rate distribution optimization algorithm of an AVC encoder. However this is not meant to limit the scope of use or functionality of the invention. The skilled addressee will immediately appreciate that the bit rate estimation method may find application in other data and video compression methods. Further, in the preferred embodiments of the invention the bit rate estimation method is based on five syntax tokens of context-based adaptive variable length coding (CAVLC). This is also not meant to limit the scope of use or functionality of the invention and the skilled addressee will immediately appreciate that the bit rate estimation method may be adapted to basis on other entropy or variable length encoding techniques.

Prior to describing a further embodiment of the invention herein a review of the AVC rate-distortion optimized mode decision and CAVLC is given AVC Rate-Distortion (RD) Optimization Mode Decision To take the full advantages of all modes in the AVC standard an encoder can determine the mode that meets the best RD tradeoff using an RD optimization mode decision scheme. Let us denote $S_t$ as a block of any rectangular size in a frame at time t; while $C_{t-\tau}$ is a reconstructed block of the same block size as $S_t$ located in the previously coded frame at time t−τ (τ=0 in intra frame coding). Then the best mode for every block that produces the minimum rate-distortion cost is given by $$J_{RD}(S_t,C_{t-\tau},m|QP,\lambda_m)=SSD(S_t,C_{t-\tau},m|QP)+\lambda_m R(S_t,C_{t-\tau},m|QP) \quad (1)$$

where QP is the macroblock quantization parameter, $\lambda_m$ is the Lagrangian multiplier and m is the candidate mode.

A connection between the local Lagrangian multiplier and the QP can be found experimentally as $$\lambda=0.85\times 2^{(QP-12)/3} \quad (2)$$

In (1), SSD is the sum of squared difference between original block and reconstructed block, defined separately in terms of intra and inter frame coding $$SSD_{intra}(S_t, C_t, m | QP) = \sum_i \sum_j \left| S_t(i, j) - C_t(i, j, m | QP) \right|^2 \quad (3)$$

$$SSD_{inter}(S_t, C_{t-\tau}, m | QP) = \sum_i \sum_j \left| S_t(i, j) - C_{t-\tau}(i + mv_i, j + mv_j, m | QP) \right|^2 \quad (4)$$

where (i, j) represent the ith and jth element and ($mv_i$, $mv_j$) represents the motion vector in the inter-frame case.

The R in (1) can be written as $$R = R_{header} + R_{motion} + R_{res} \quad (5)$$

where $R_{header}$, $R_{motion}$ and $R_{res}$ are the number of bits needed to encode the header information, motion vectors and quantized residual block respectively.

Context-Based Adaptive Variable Length Coding (CAVLC)

Context Adaptive Variable Length Coding (CAVLC) is designed to take advantage of several characteristics of quantized 4×4 blocks. The block is encoded using five syntax elements. These elements are described as follows:

1. coeff_token: Both the total number of nonzero coefficients and the number of trailing +/−1 s are coded as a combined event. If number of trailing +/−1 s is greater than 3, last 3 trailing +/−1 s of zig-zig ordered block are consider as trailing +/−1 s and remaining trailing +/−1 s are consider as normal coefficient. One out of 4 VLC tables is used. Since the number of non-zero coefficients in neighboring blocks are usually correlated, the selection of VLC table is dependent on the number of non-zero coefficients in neighboring blocks.

2. Sign of trailing +/−1: One bit is used to signal sign information of trailing +/−1 s. 0 is used for positive and 1 is used for negative.

3. Level: The magnitude (level) of non-zero coefficients gets larger near the DC coefficient and gets smaller around the high frequency coefficients. CAVLC takes advantage of this by making the choice of the VLC look-up table for the level adaptive in a way where the choice depends on the recently coded levels. One out of 7 VLC tables is used to encode the level information.

4. Total_zeros: The codeword Total_zeros is the number of zeros between the last non-zero coefficient of the zig-zag scan and its start. One out of 15 VLC tables is chosen based on the number of non-zero coefficients.

5. Run_before: Run_before means the number of preceding zeros before each non-zero coefficient and Zeros_left called the number of zeros left before each non-zero coefficient. Based on Run_before and Zeros_left, one out of 7 VLC tables is used to encode this element.

Further information on CAVLC can be found MPEG4 Part 10/H.264 and Iain E. G. Richardson, H.264 and MPEG-4 Video Compression—video coding for next generation multimedia, John Wily & Sons.

For example, if the coefficients in the zig-zag order of a 4×4 block are [4, −2, 0, 1, 0, 1, −1, 1, 0, 0 . . . ]. Here total number of non-zero coefficients ($T_c$) is 6, total number of zero before the last nonzero coefficients ($T_z$) is 2, number of trailing one's ($T_0$) is 3. Based on the VLC tables shown in Table I, the transmitted bit stream for this block is 0000010001010110001011111010.

Bit Rate Estimation Method

To reduce the complexity of rate-distortion cost computation in AVC a bit rate estimation method is disclosed herein that avoids CAVLC coding during each iteration of the Intra and Inter mode decision. The bit rate estimation method predicts the number of entropy coded bits based on the quantized transform coefficients, thus avoiding the need to entropy coded the quantized transform coefficients at each decision iteration.

To estimate the number of CAVLC coded bits for the quantized transform coefficients, we estimate the number of bits for each of five different types of symbols of CAVLC separately.

Figure 5A:
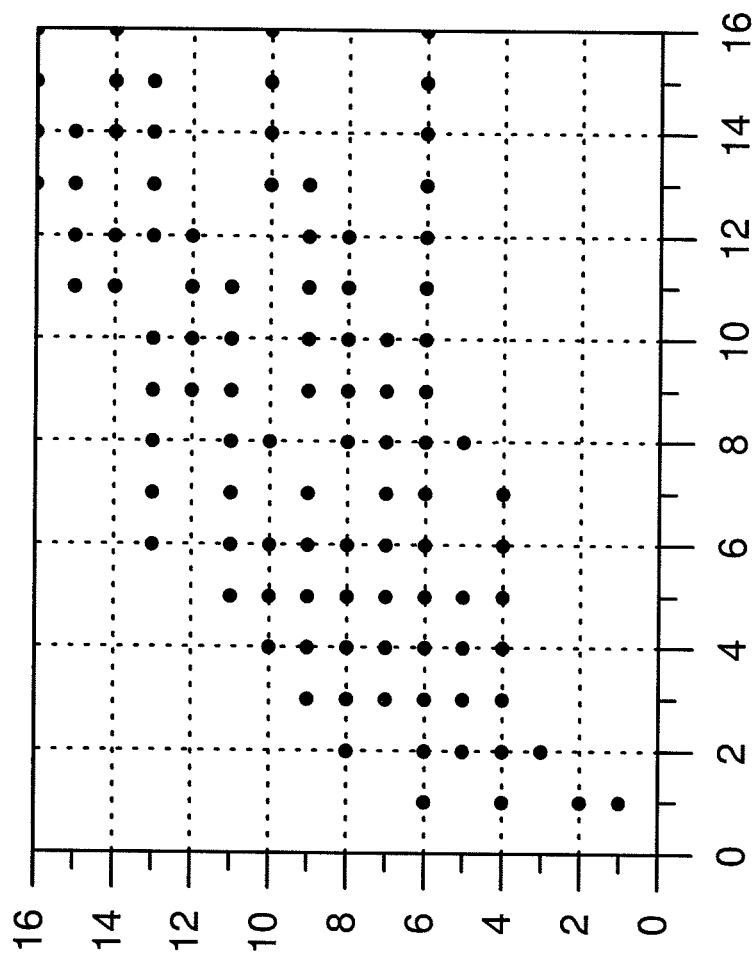
FIG. 5a is a plot diagram for actual rate of coeff_token versus no. of non-zero coefficients.

1. The coefficient token (the number of coefficients, the number of trailing ones): Four VLC tables are used for encoding coefficient token. Selection of VLC table is context adaptive. FIG. 5(a) shows the plot of actual bit rate to encode the coefficient token versus the number of coefficients of foreman video sequence at QP=28. Similar results were found for other video sequences. It is clearly shown that bit consumption to encode the coefficient token is increased with number of coefficients. Based on VLC tables, it is also shown that bit rate for coefficient token is decreased with number of trailing ones. Based on this criteria, we propose the number of bits require to encode the coefficient token is $$R_{coeff} = w_1 T_c - w_2 T_0 + w_3 \quad (7)$$

where $T_c$ and $T_0$ are same as equation (6). These $w_1$, $w_2$ and $w_3$ are weighting constants. In order to set the weighting factors, we have done several experiments for different video sequences (akiyo, foreman, stefan, mobile, table tennis, paris) with QCIF format at different QP values. We have observed rate-distortion performance of these video sequences at different combinations of weighting factor. Better rate-distortion performance was found at $w_1 = w_2 = 1$, $w_3 = 0$.

2. The sign of trailing ones: For each $T_0$, a single bit encodes the sign (0=+, 1=−). So bit consumption to encode the trailing ones as follows:

$$R_{trail1} = T_0 \quad (8)$$

Figure 5B:
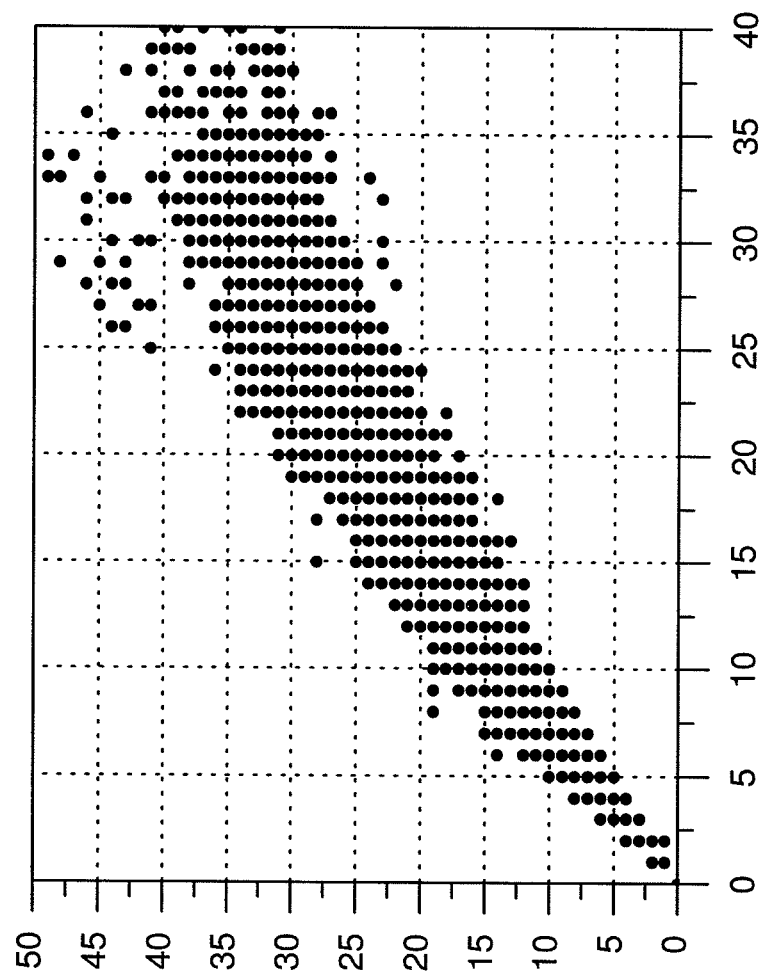
FIG. 5b is a plot diagram for actual rate of level versus $SAT_1$.
Figure 6A:
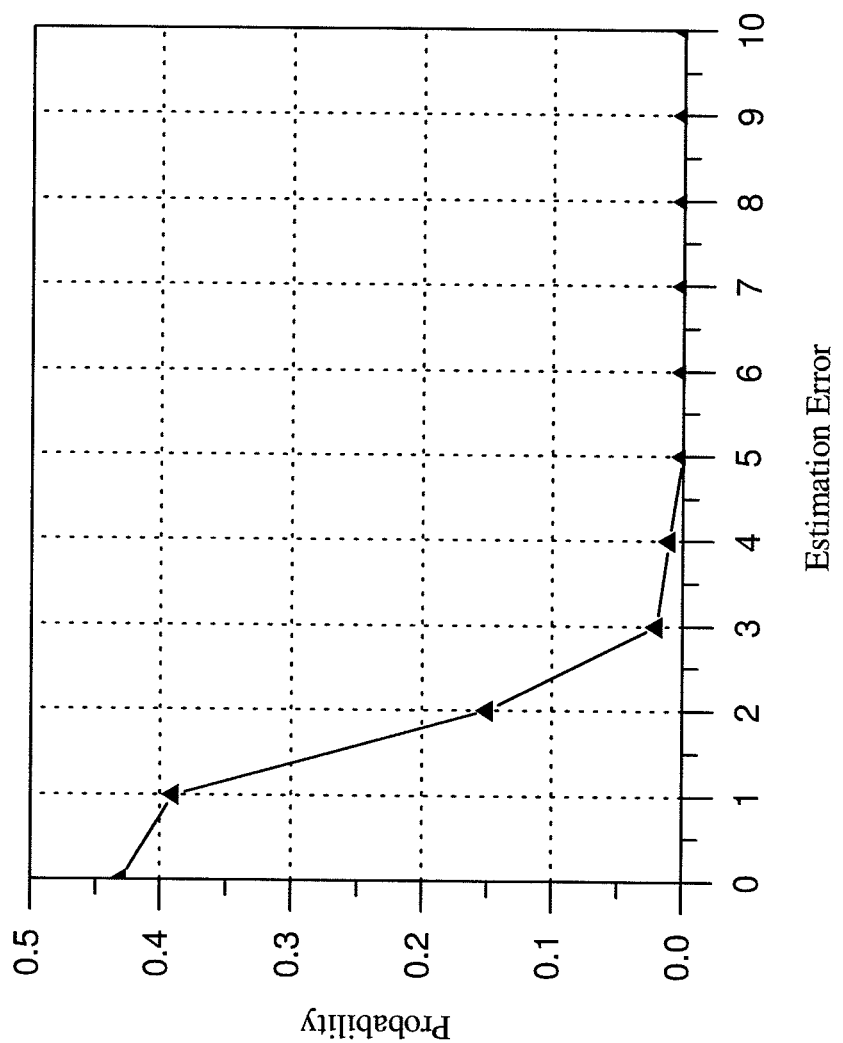
FIG. 6a is a graphical illustration of probability of estimation error of Coeff_token.
Figure 6B:
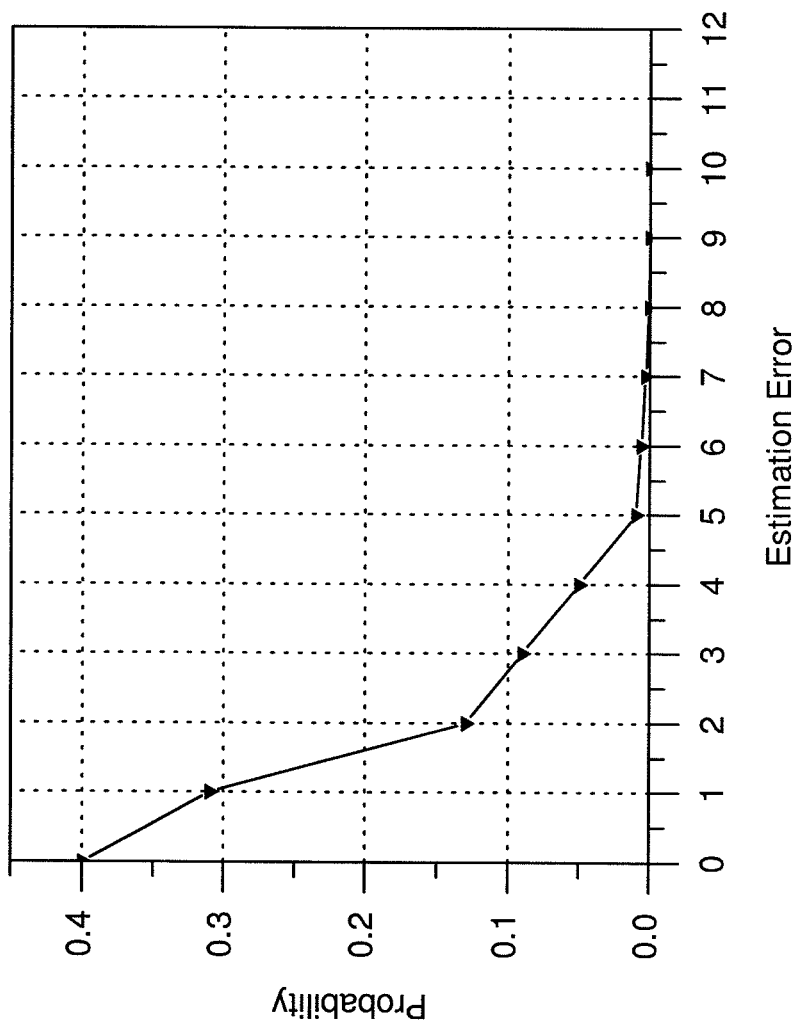
FIG. 6b is a graphical illustration of probability of estimation error of level.
Figure 6C:
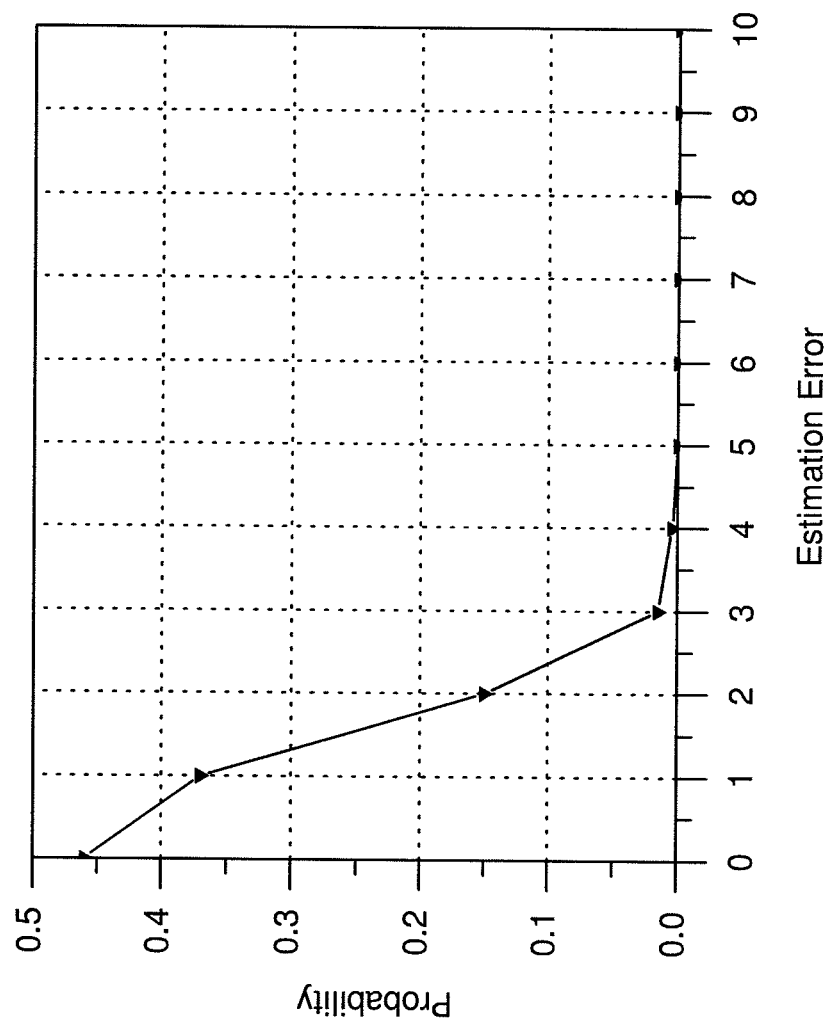
FIG. 6c is a graphical illustration of probability of estimation error of total zero.
Figure 6D:
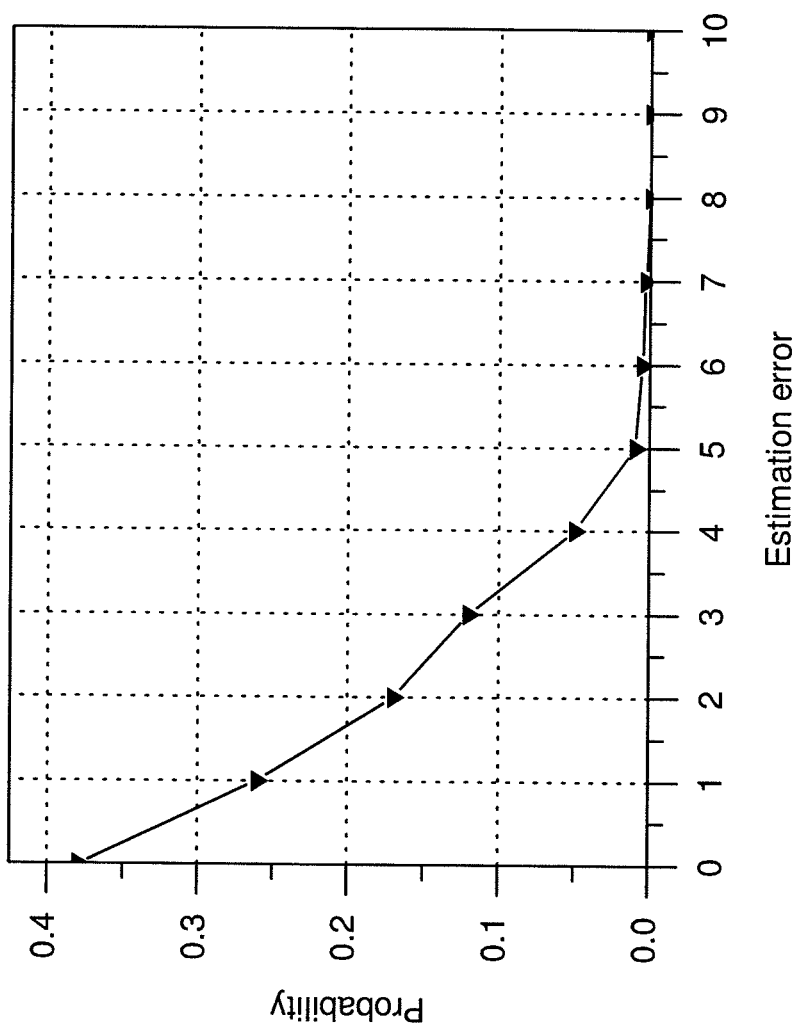
FIG. 6d is a graphical illustration of probability of estimation error of run.
Figure 7:
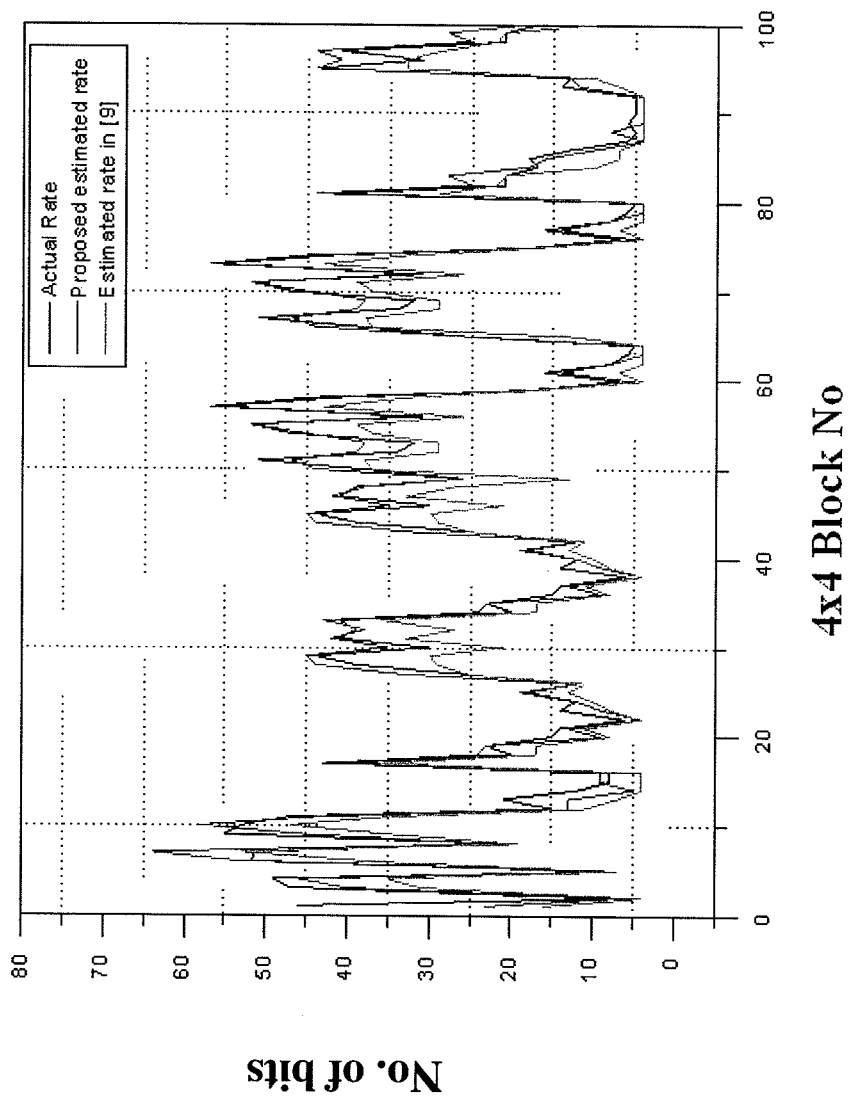
FIG. 7 is a graphical illustration of comparison of the method proposed by the invention with a rate estimation method known in the prior art, FIG. 8 consists of graphical illustrations showing curves of the estimated and the actual rates of first 100 macroblocks of I frame of intra coding of foreman and Stefan sequences (X-axis: Macroblock number, Y-axis: number of bits), FIG. 9 consists of graphical illustrations showing rate-distortion performance of proposed rate estimation method of different video sequences while all frames are intra coded, FIG. 10 consists of graphical illustrations showing curves of the estimated and the actual rates of first 100 macroblocks of P frame of inter coding of foreman and Stefan sequences (X-axis: Macroblock number, Y-axis: number of bits)
Figure 8A:
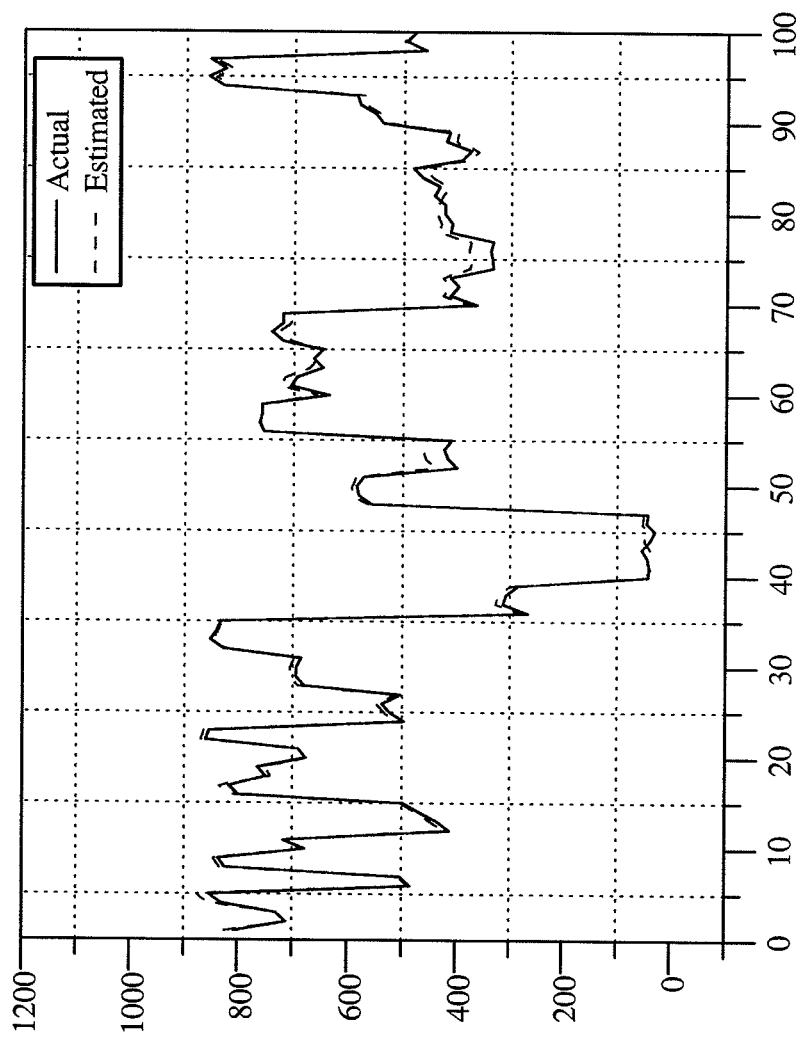
Figure 8B:
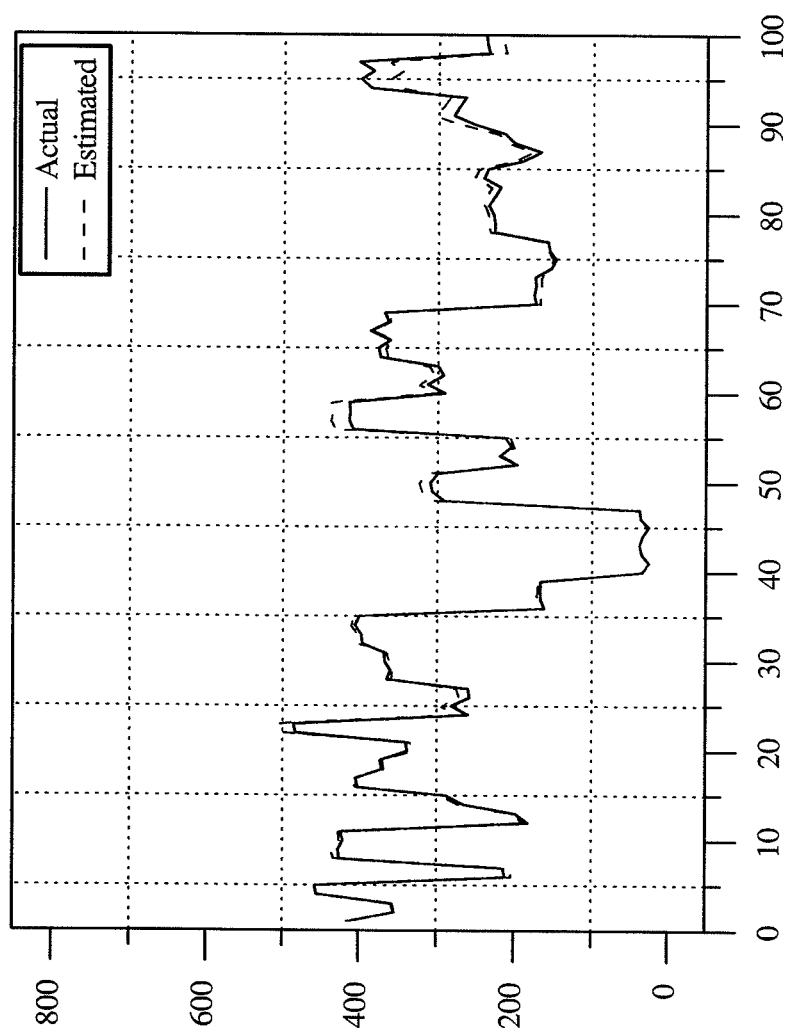
Figure 8C:
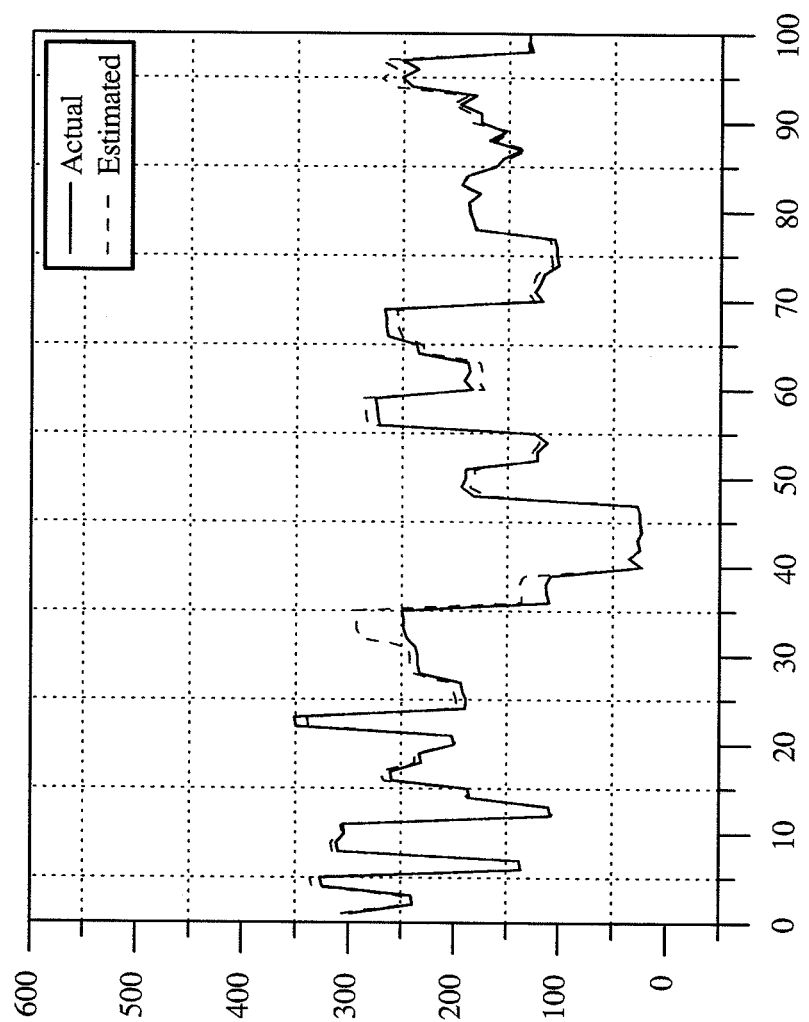
Figure 8D:
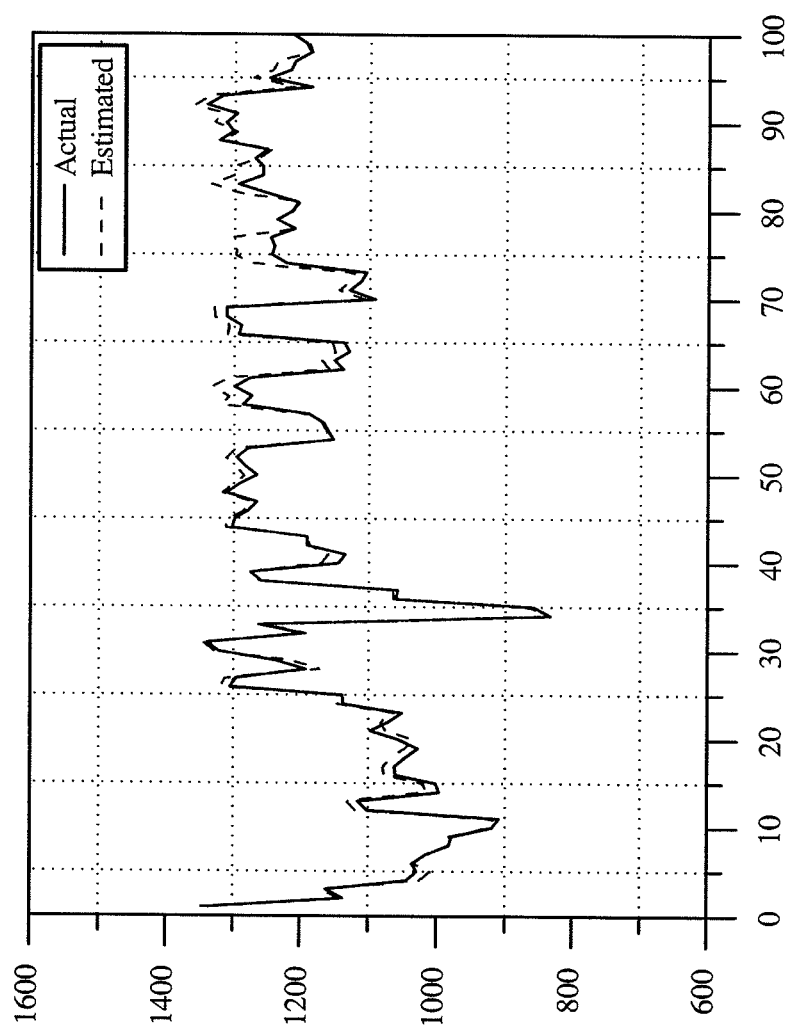
Figure 8E:
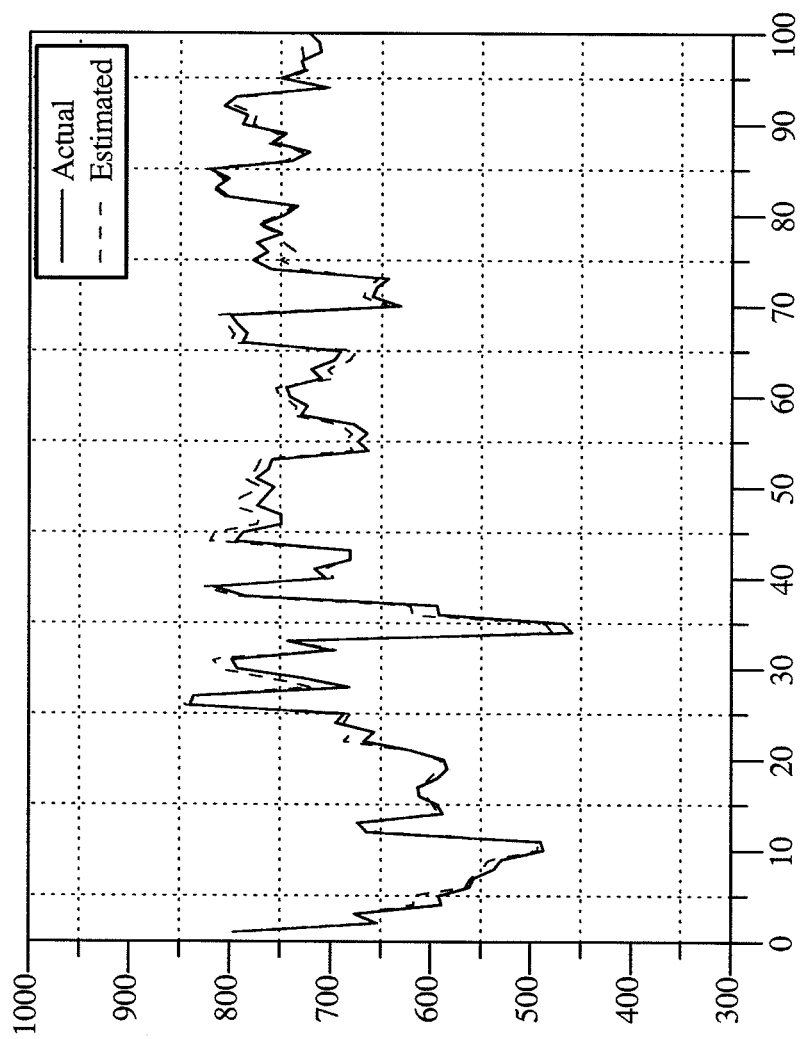
Figure 8F:
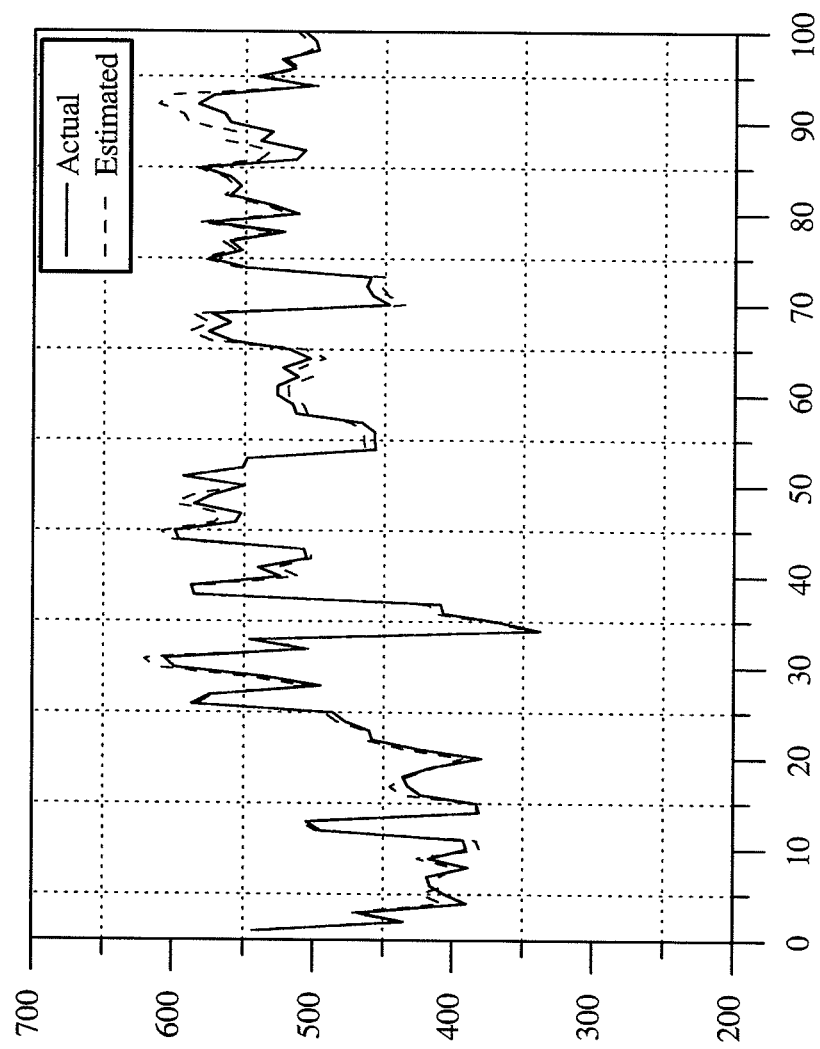
Figure 9A:
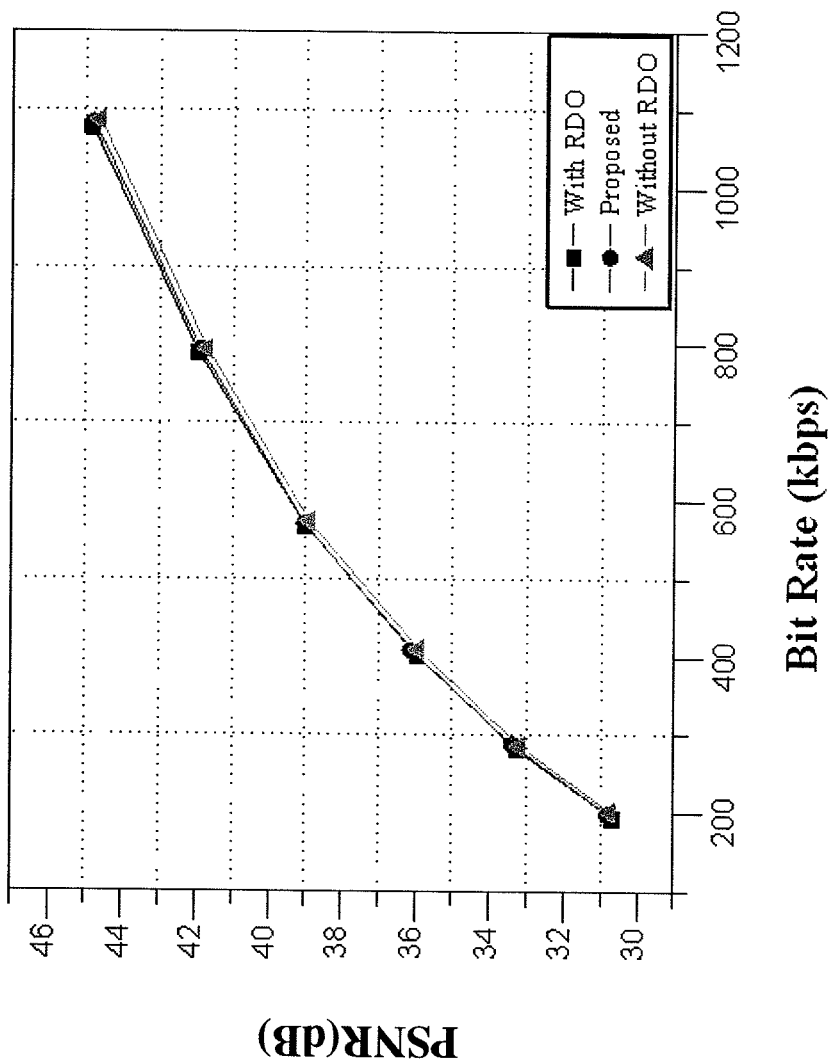
Figure 9B:
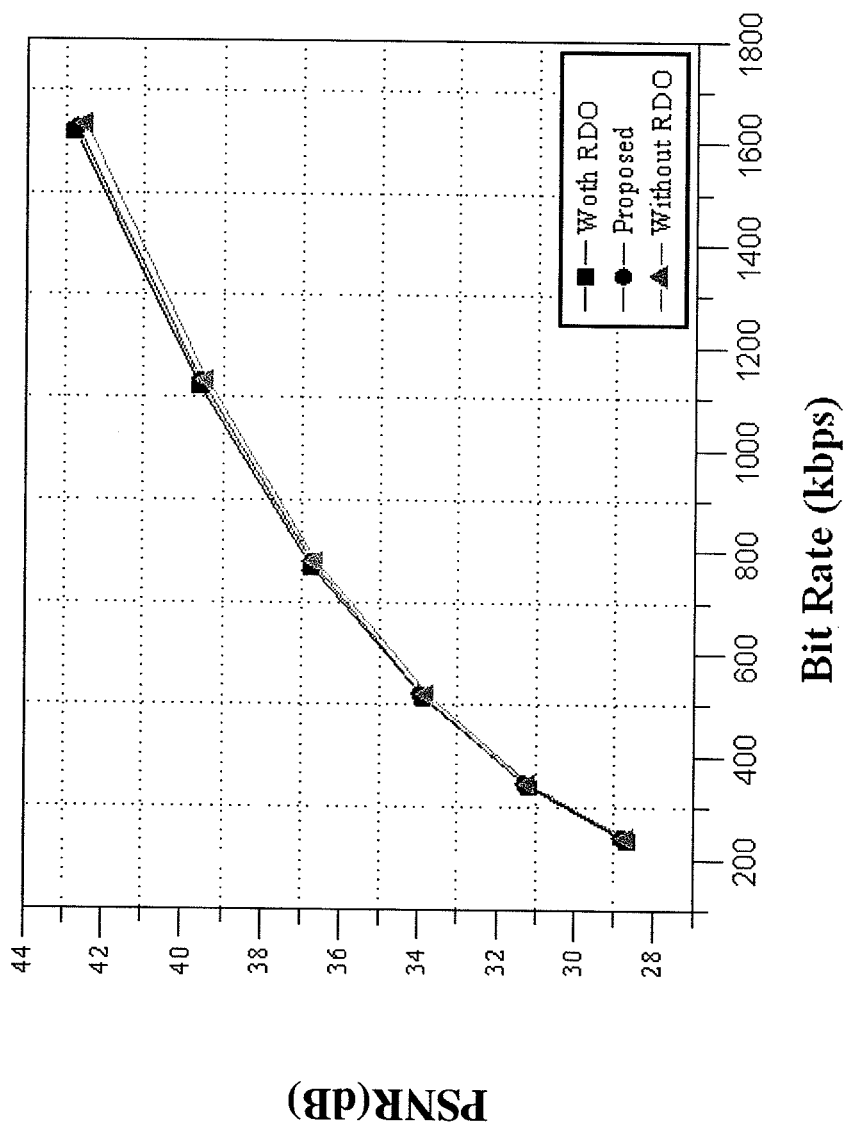
Figure 9C:
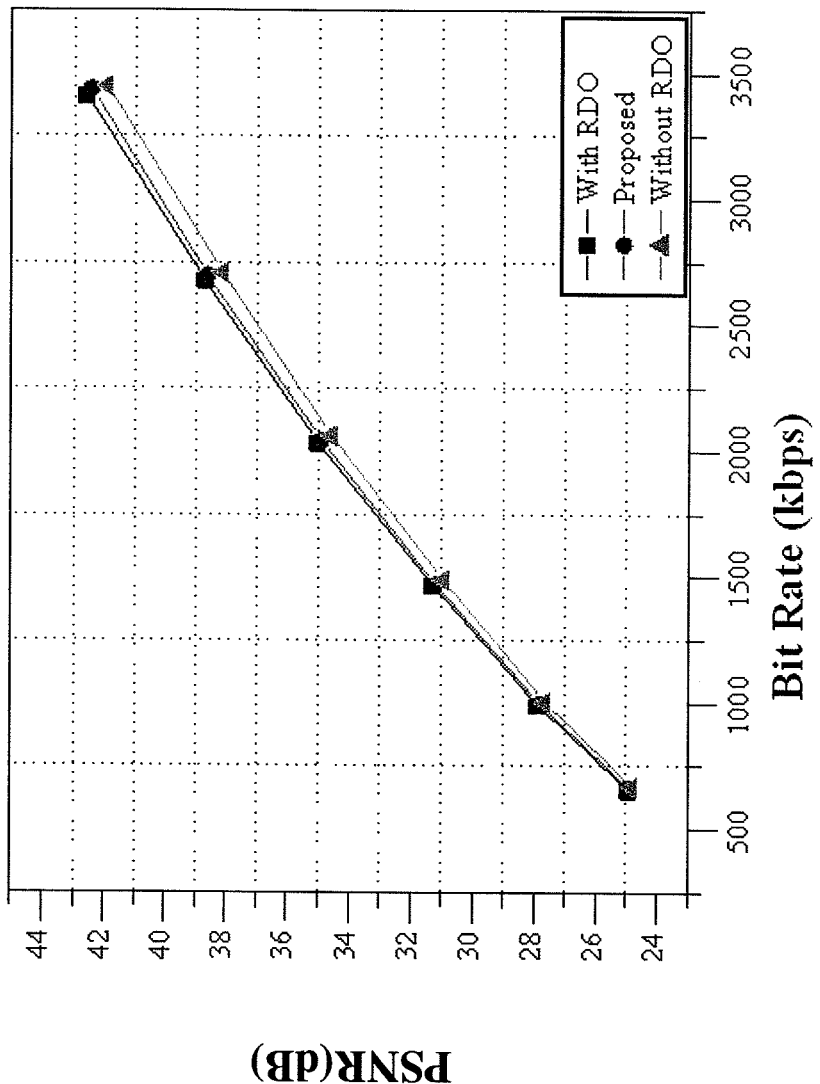
Figure 9D:
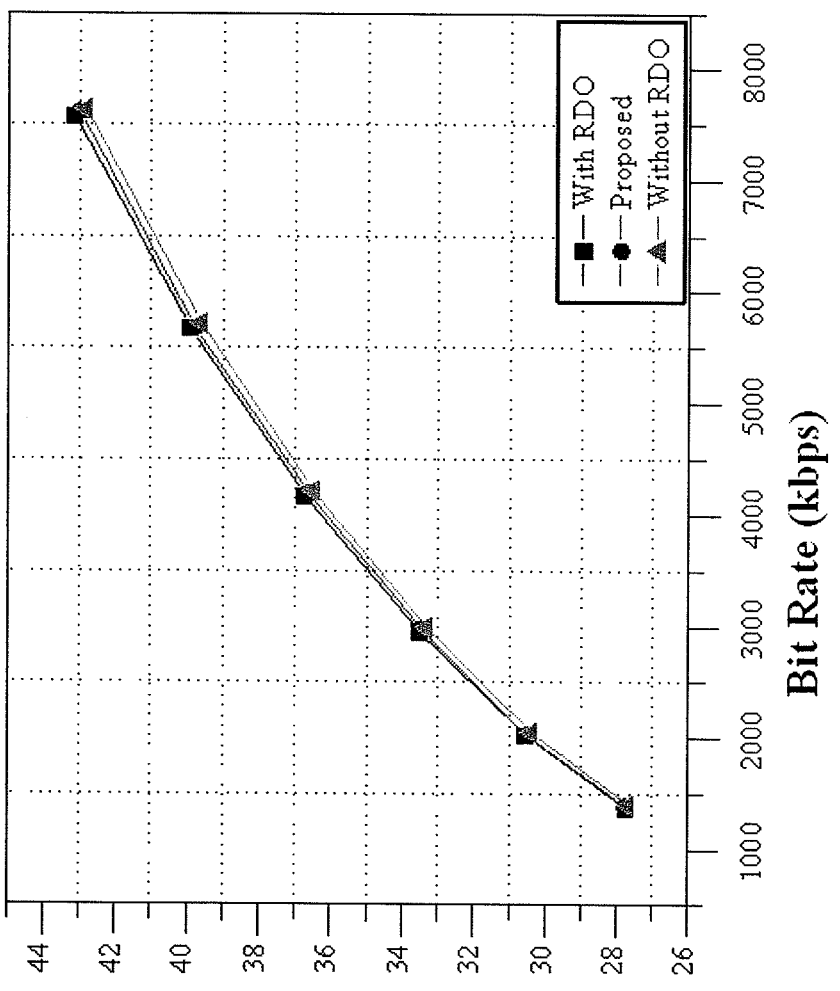
Figure 9E:
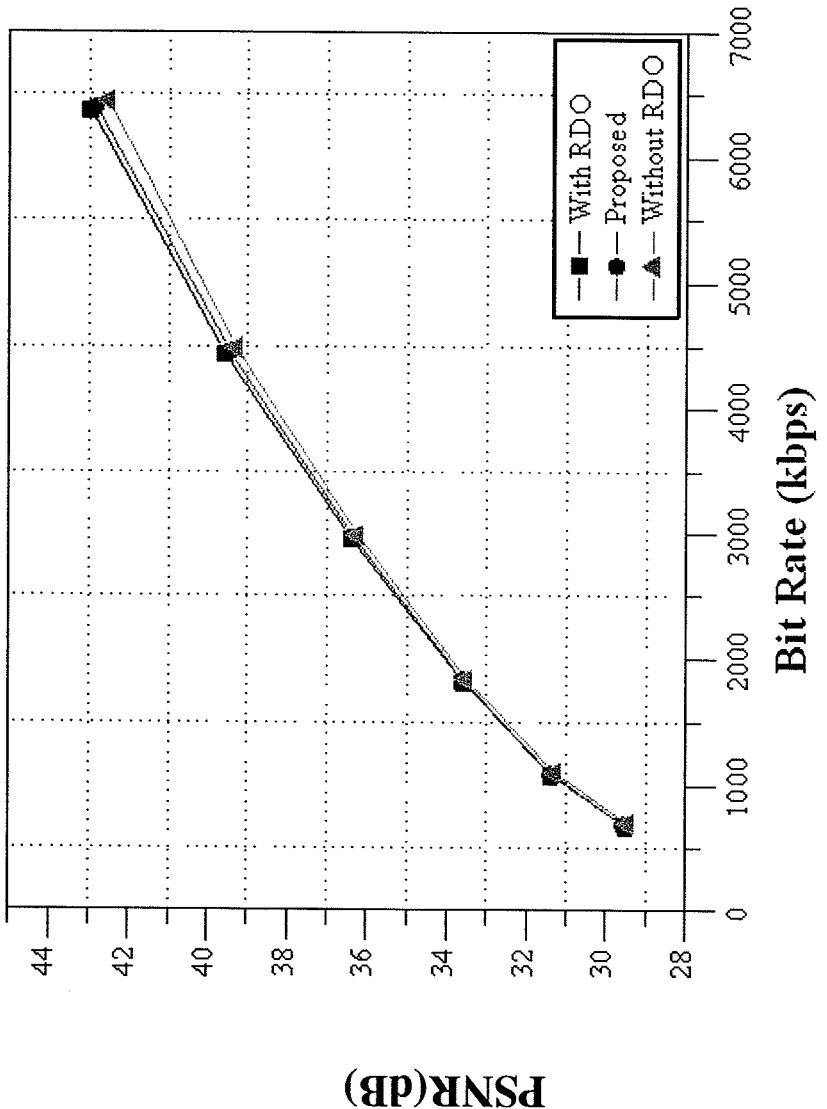
Figure 9F:
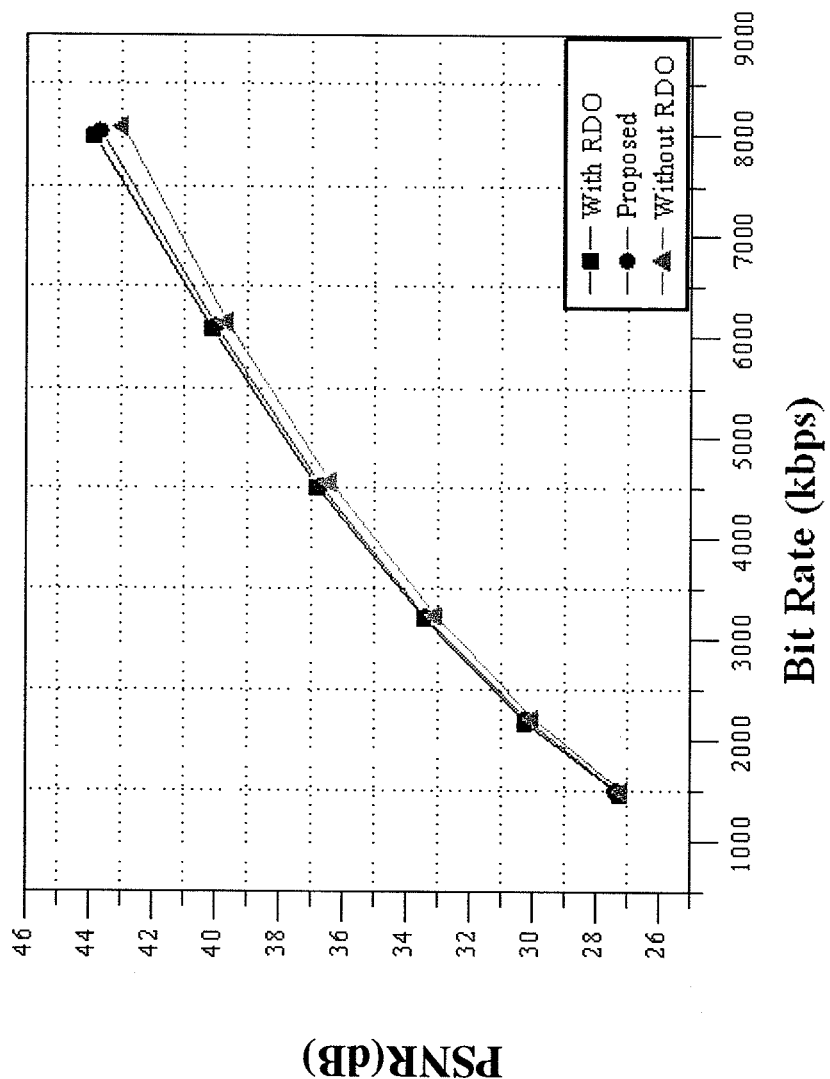
Figure 10A:
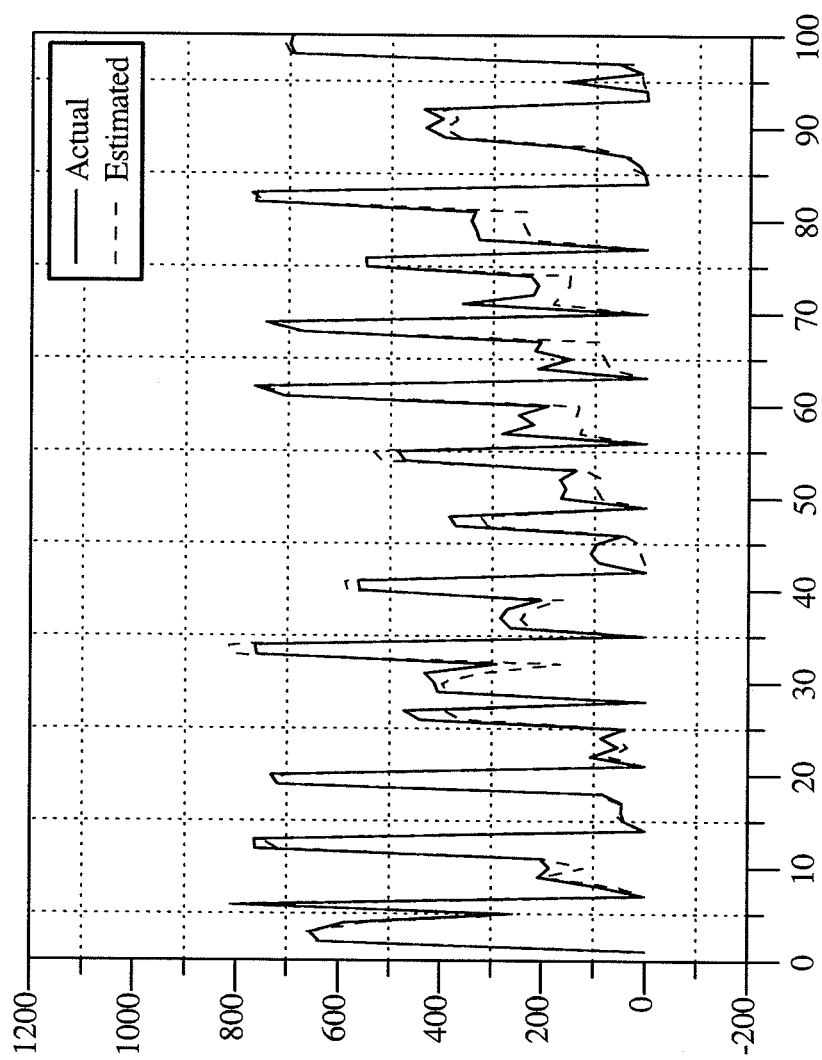
Figure 10B:
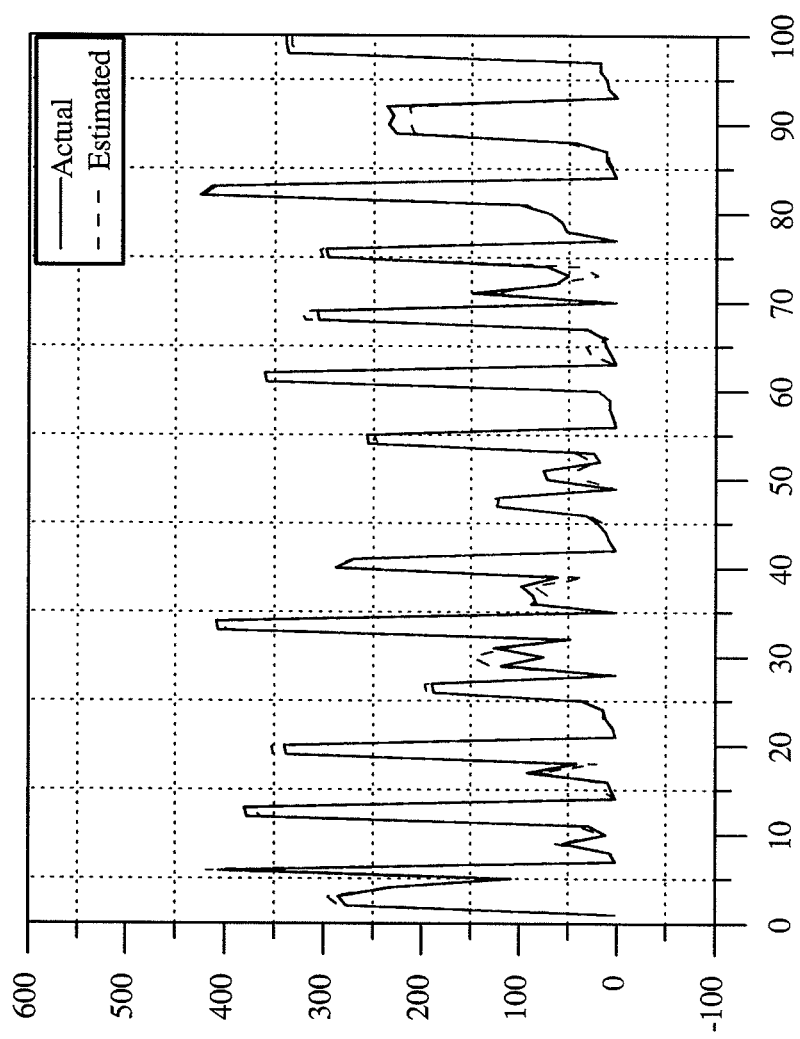
Figure 10C:
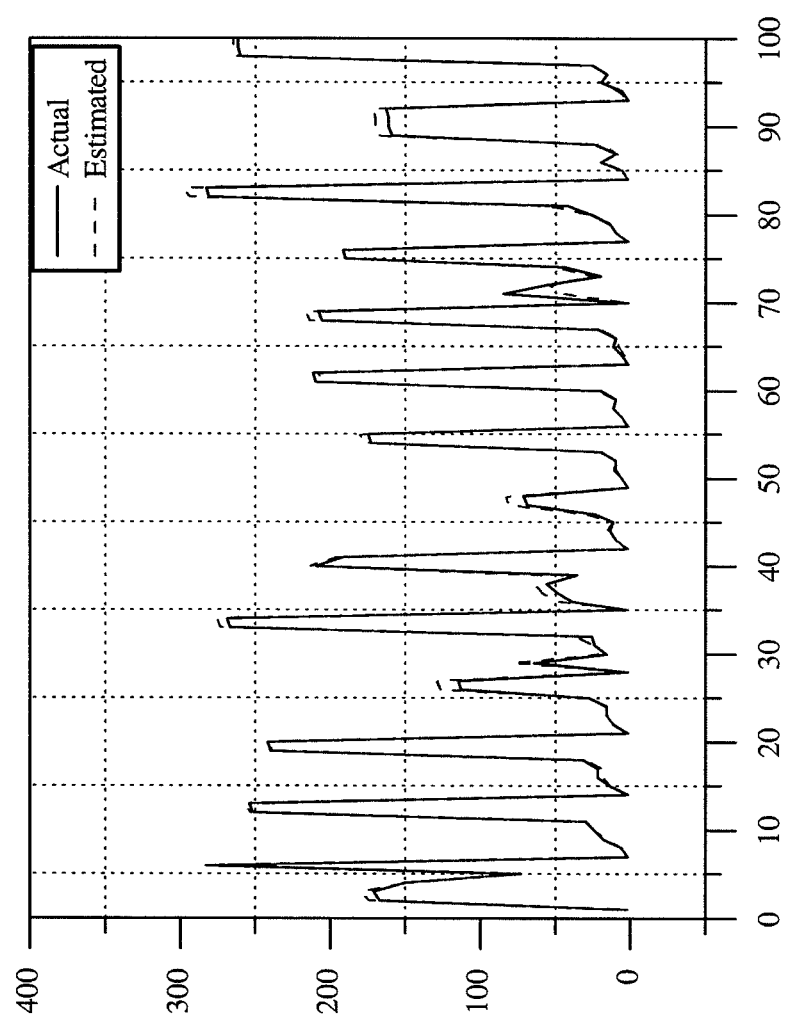
Figure 10D:
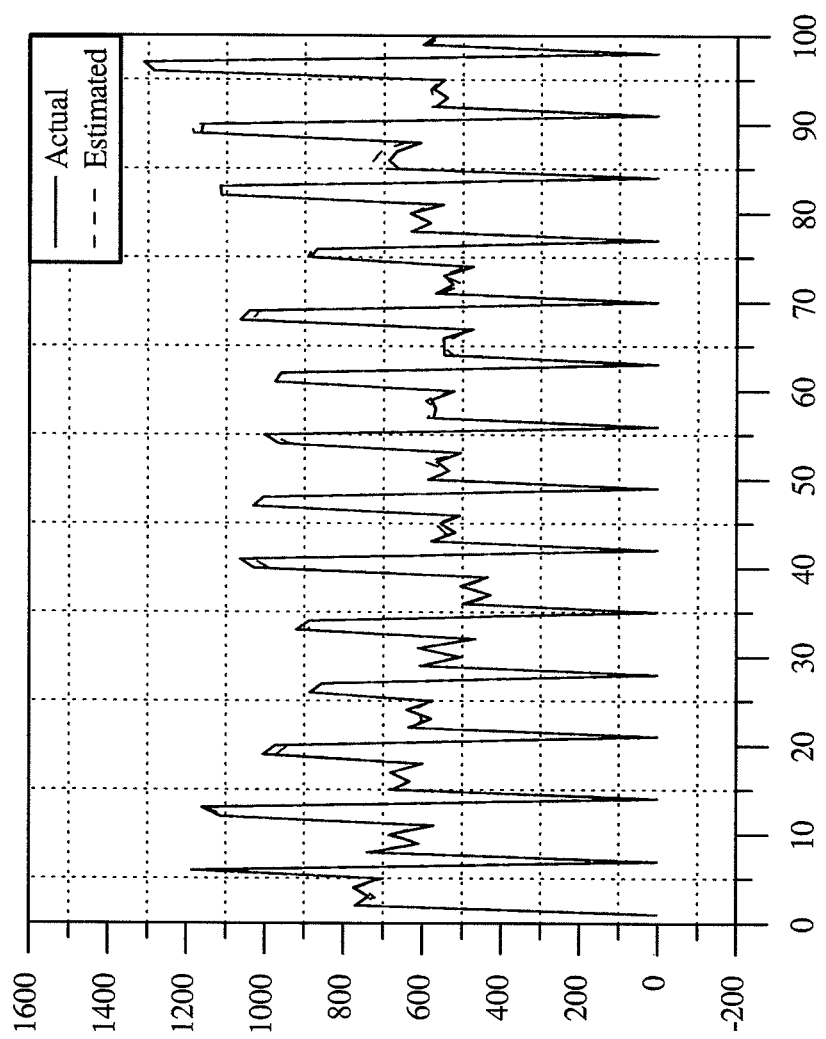
Figure 10E:
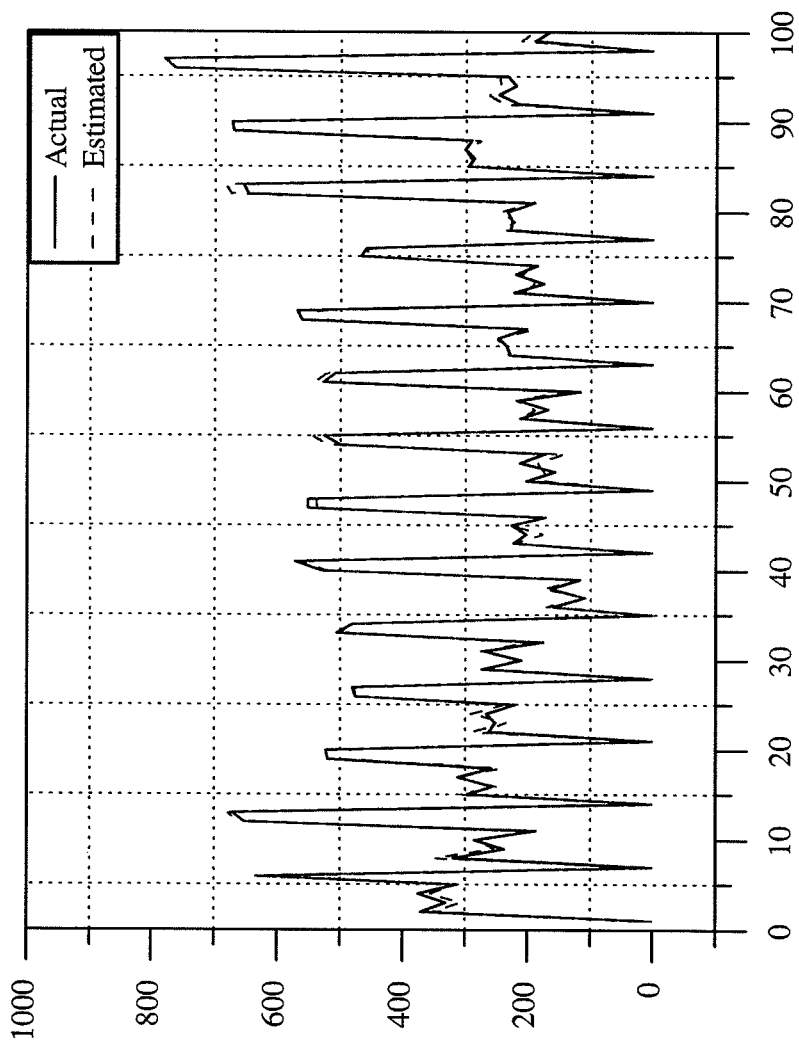
Figure 10F:
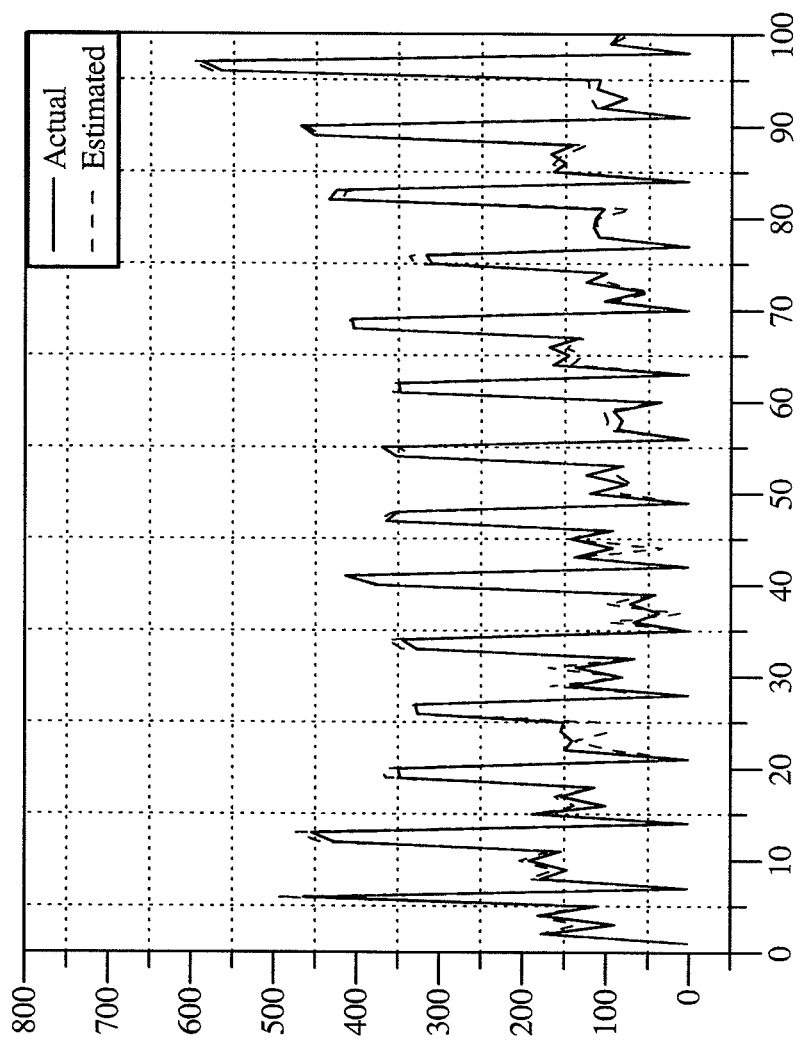
Figure 11A:
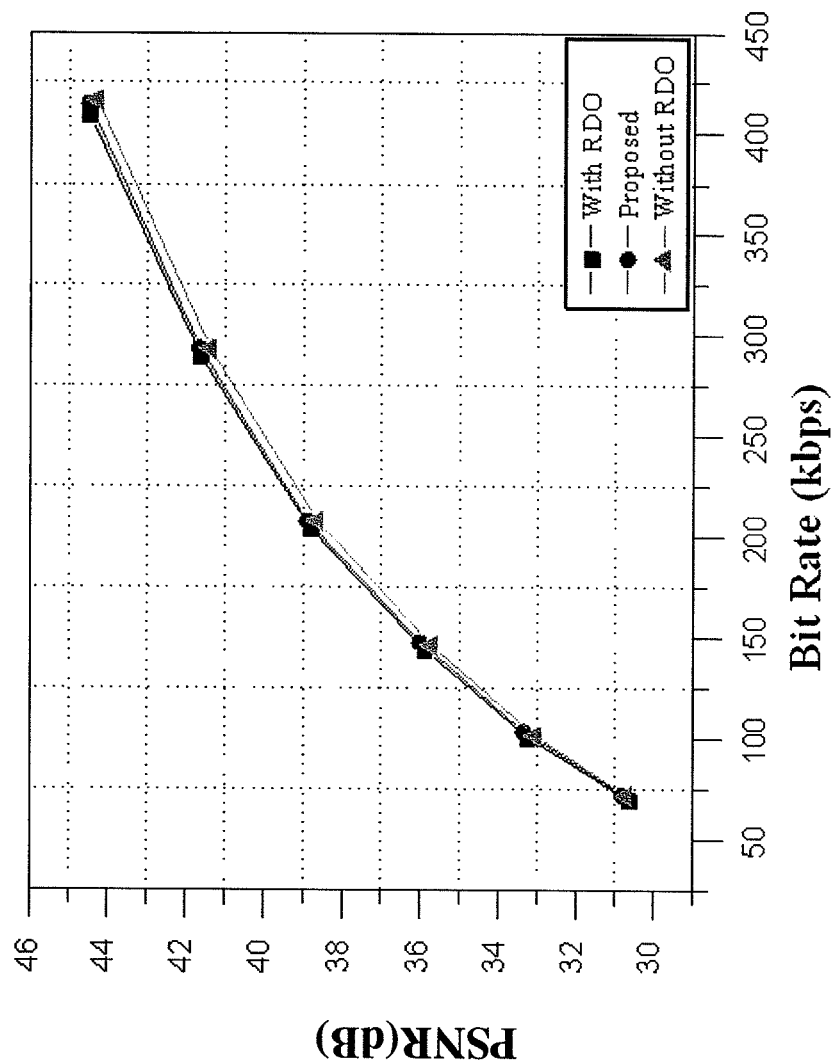
FIG. 11 consists of graphical illustrations showing rate-distortion performance of proposed rate estimation method of different video sequences during Inter frame (IPP sequences) coding.
Figure 11B:
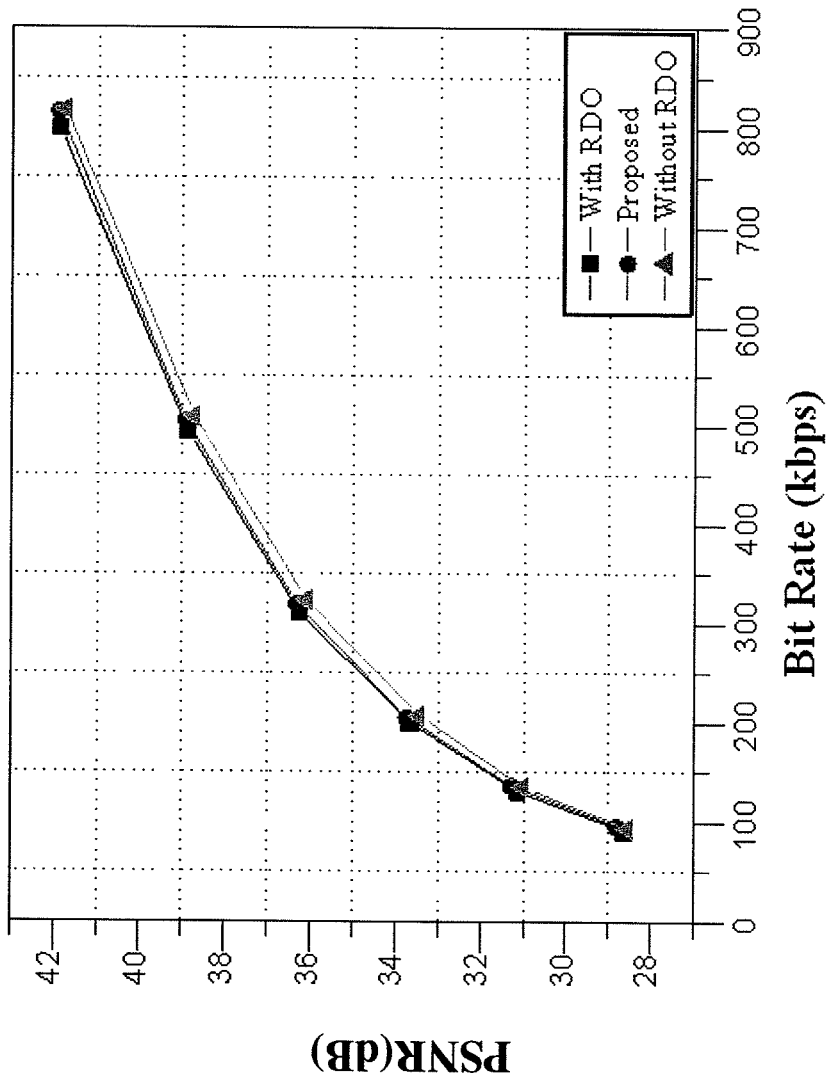
Figure 11C:
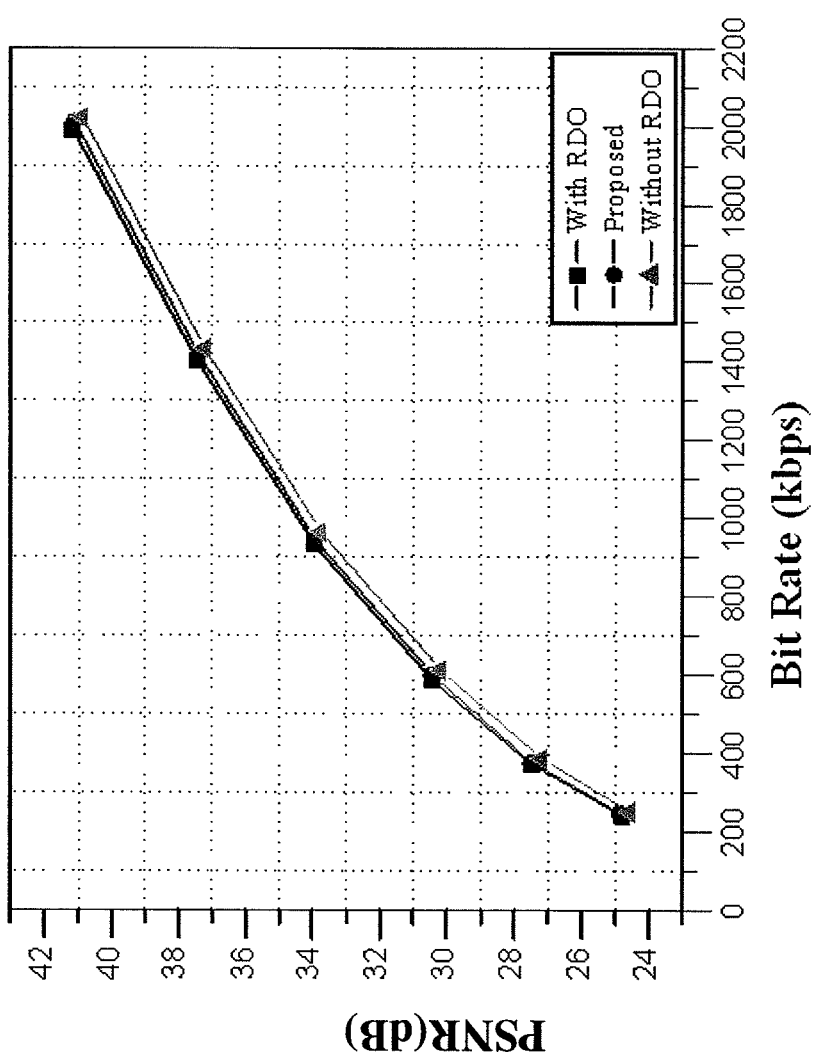
Figure 11D:
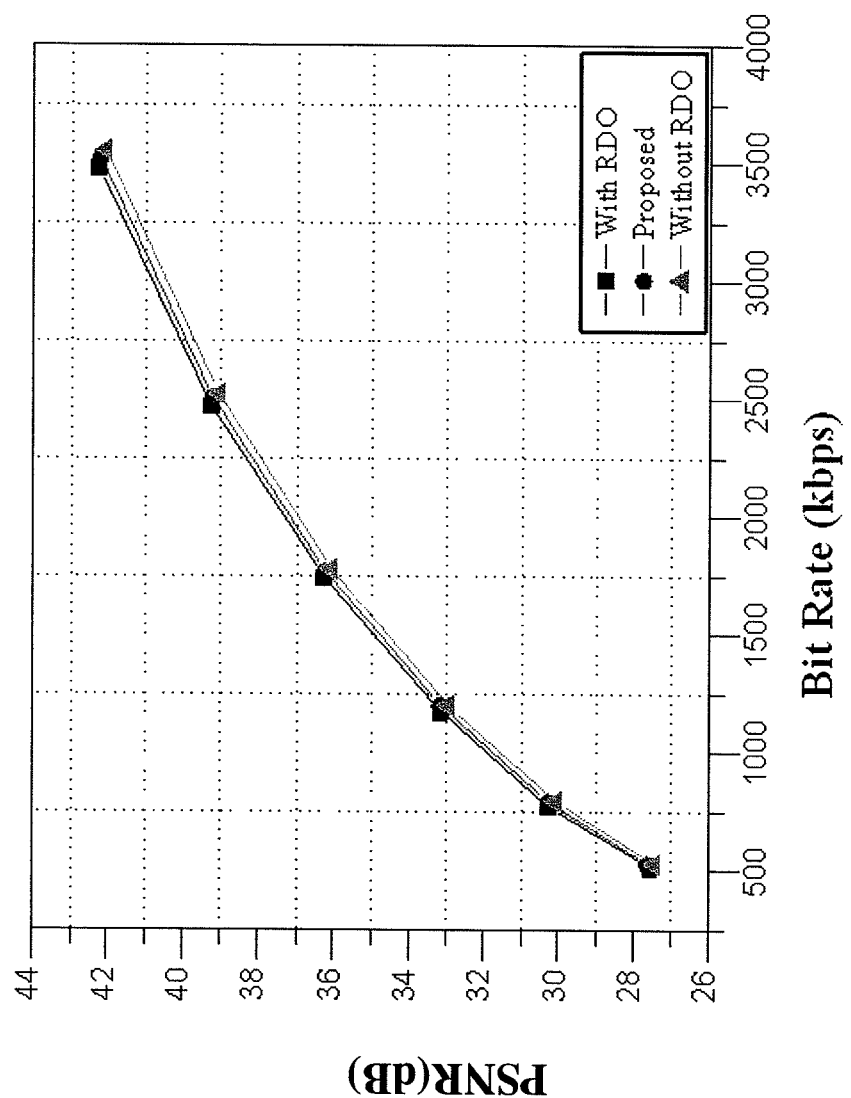
Figure 11E:
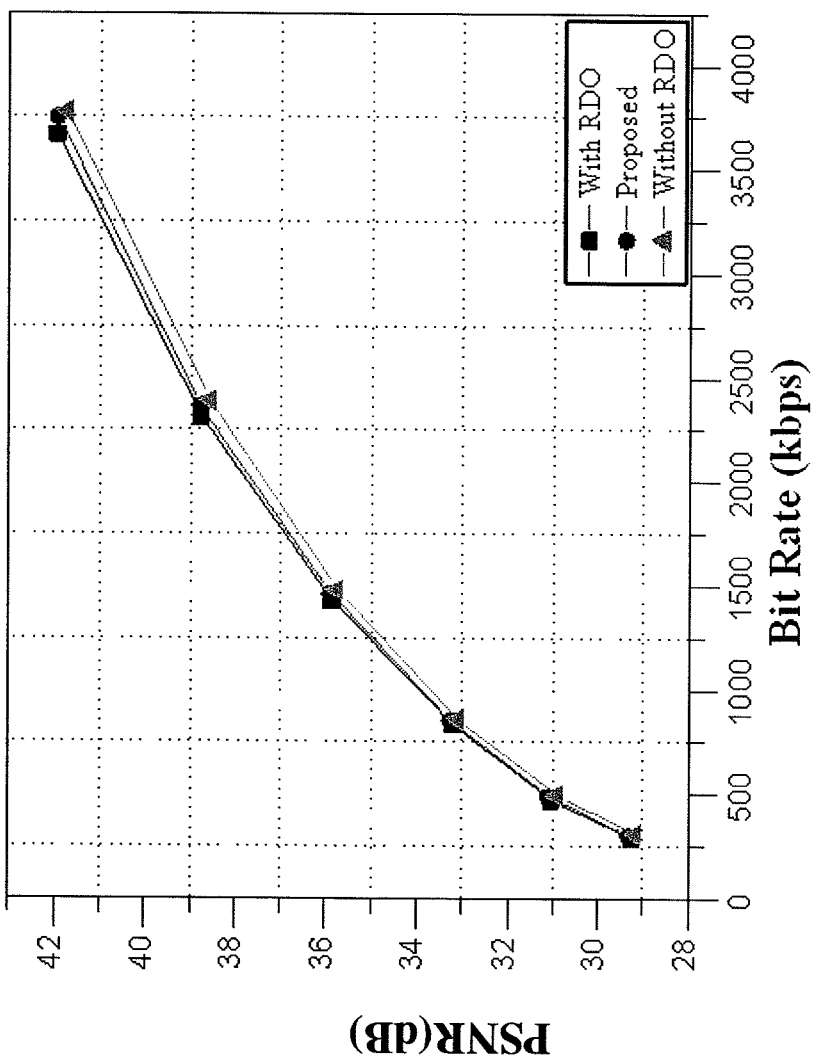
Figure 11F:
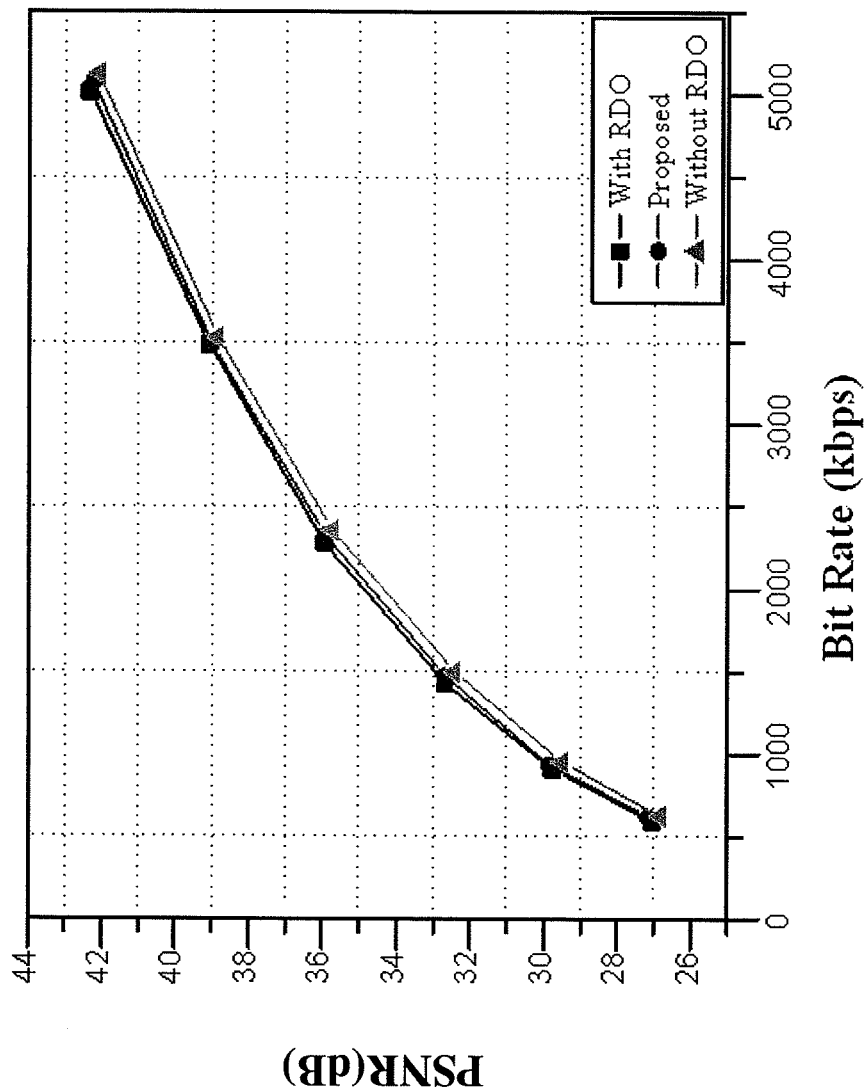

3. The level of nonzero coefficients: From the observation of level-VLC tables, it is shown that bit requirement is increased with magnitude of non-zero coefficients. Number of bits to encode the level information is proposed as follows:

$$R_{level} = w_4 SAT_l \quad (9)$$

with the $SAT_l$ given by $$SAT_l = \sum_{k=1}^{T_c} |L_k| \quad (10)$$

where $|L_k|$ is the absolute value of $k_{th}$ non-zero coefficient, $SAT_l$ is the sum of absolute values of all levels of quantized transform residual block. $w_4$ is a positive constant. Suppose two coefficients are encoded using same level_VLC table. If the magnitude of first coefficient ($|L_1|$) is larger than that of second coefficient ($|L_2|$) from level_VLC table it is shown that rate for first coefficient $R(L_t)$ also greater than that of second coefficient $R(L_2)$. So equation (9) is valid. Let us consider two coefficients are encoded using multiple level_VLC tables. If the earlier coefficient is not larger than the other coefficient, by observing the all level_VLC tables there is $R(L_1) > R(L_2)$ if $|L_1| > |L_2|$. In some times, $R(L_1) > R(L_2)$ if $|L_1| < |L_2|$ but fortunately this event does not occur high frequently and is slightly influence the estimation result. FIG. 5(b) shows the plot of actual bit rate to encode the level information with $SAT_l$ of foreman video sequence at QP=28 Similar results were found for other video sequences. By changing the value of $w_4$, we have observed RD performance of different sequences. Better results were found with $w_4 = 1$.

4. Encode the total number of zeros before the last coefficient: From the observation of total zero VLC tables, it is shown than bit consumption to encode the total zero is increased with number of total zero. So we can propose the estimated bits for total zero is as follows $$R_{zero} = w_5 T_z \quad (11)$$

where $w_5$ is a positive constant and $T_z$ is the total number of zeros before the last non-zero coefficients. Here $w_5 = 1$, which is found in similar way of $w_4$.

5. Encode each run of zeros: After the DCT transform, the high frequency coefficient usually has small energy. By quantization, more zeros are found at the high frequency position of quantized transform block. So the value of Run for the high frequency non-zero coefficients is larger. From the observation of run VLC tables, it is shown that more bits are required for large value of run. So bit consumption is higher to encode the run of high frequency non-zero coefficients. Based on this idea, we propose the rate for run of each non-zero coefficients as follow:

$$R_{run_{(k)}} = w_6 f_k, \quad 0 \leq f_k \leq 15 \quad (12)$$

where, $f_k$ is the frequency of $k_{th}$ non-zero coefficient of recorded block and $w_6$ is the positive constant. For example, given a string of coefficients [0, 3, 0, 1, −1, −1, 0, 1, 0, 0 . . . ], frequency of first non-zero coefficient (3) is 1 and frequency of last non-zero coefficient (1) is 7. The weighting factor $w_6 = 0.3$ is found in similar way of $w_4$. From above analysis, we have estimated the bits needed to encode a 4×4 residual block ($R_{est_{(res)}}$) is $$R_{est_{(res)}} = R_{coeff} + R_{trail1} + R_{level} + R_{zero} + \sum_{k=1}^{T_c} R_{run_{(k)}} \quad (13)$$

$$= w_1 T_c - w_2 T_0 + w_3 + T_o + w_4 SAT_l + w_5 T_z +$$

$$\sum_{k=1}^{T_c}(w_6 f_k)$$

By putting the values of different constants, the proposed rate estimator becomes $$R_{est(res)} = T_c + T_z + SAT_l + 0.3\sum_{k=1}^{T_c} f_k \qquad (14)$$

FIG. 6 shows the probability of estimation error of four different types of symbols. Estimation error of the symbol is the absolute difference between actual bit rate and estimated bit rate of that symbol. Y-coordinate of FIG. 6 is the probability of corresponding estimation error. It is shown that most of the estimation errors of each symbol are between 0 to 4 and the probability of each symbol that the estimated rate perfectly match with CAVLC is about 40%.

Experimental Results

To verify the proposed technique, JM 8.3 reference software was used in simulation. Six well-known video sequences are used as test materials. The test conditions are as follows:
a) Hadamard transform is used
b) RD optimization is enabled
c) CAVLC is enabled.
d) Frame rate is 30
e) MV search range is ±32 pels for QCIF and CIF
f) Fast motion estimation algorithm is used [Ref—Zhibo Chen, Peng Zhou, Yun He, "*Fast Integer Pel and Fractional Pel Motion Estimation for JVT,*" Joint Video Team (JVT) Docs, JVT-F017, December 2002.]

A group of experiments were carried out on the test sequences with different quantization parameters. Comparison results were produced based on the percentage of difference of coding time ($\Delta T$ %), the PSNR difference ($\Delta P_{snr}$) and percentage of the bit rate difference ($\Delta$Bit %). In order to evaluate complexity reductions $\Delta T$ (%) is defined as follows $$\Delta T = \frac{T_{original} - T_{proposed}}{T_{original}} \times 100\%$$

where, $T_{original}$ denotes the total encoding time of the JM 8.3 encoder with rate distortion optimization and $T_{proposed}$ is the total encoding time with proposed fast rate estimation technique.

Experiment 1

On All Intra frame Sequence

Figure 12:
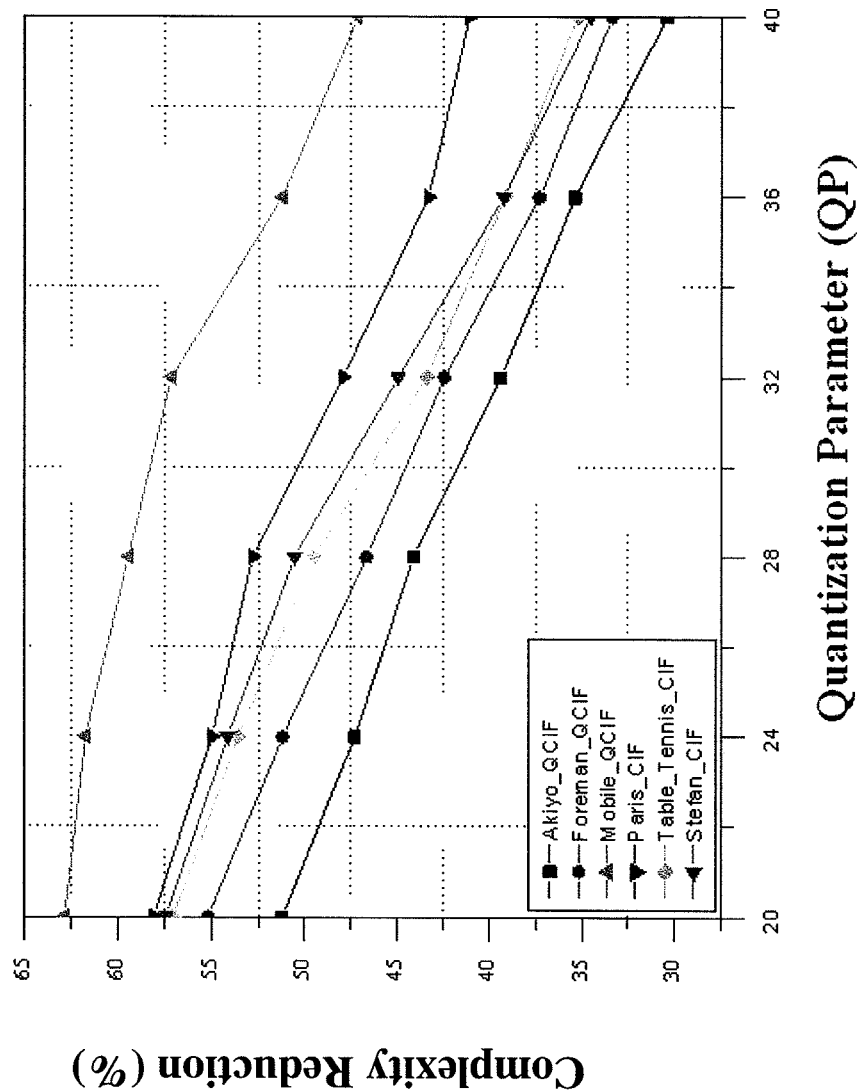
FIG. 12 is a graphical illustration of complexity reduction of different video sequences during Intra coding.

In this experiment, a total number of 100 frames are used for each sequence, and period of I-frame is set to 1, i.e., all the frames in the sequence are intracoded. Data is collected from the first 100 4×4 block of first frame of IIIIII sequence. QP factor is set as 28. By using the proposed estimation method, FIG. 8 shows the predicted rates $R_{est}(=R_{header}+R_{motion}+R_{est(res)})$ and actual rates $R(=R_{header}+R_{motion}+R_{res})$ are very closely identical, which are obtained from first 100 MBs of IIIII sequence of Foreman-QCIF and Stefan_CIF at three different (20, 28, 32) QP values. The proposed estimation achieves a precise prediction in intra frame coding. To evaluate the rate distortion performance six different sequences (Akyio, Foreman, Mobile, Paris, Table tennis and Stefan) are used in simulation. As shown in Table II, it is clear that PSNR loss and bit rate increment is negligible. FIG. 9 shows the rate-distortion curves of different sequences. The proposed method is very close with RD optimized curve. Comparing with the original H.264/AVC encoder with RD optimization, the proposed algorithm achieves about 47% time reduction of total encoding time on average. As shown in FIG. 12, for the sequence "Mobile" and "Paris", the coding speed is high because both the sequences contains high detail such as different books in bookshelf of "Paris". On the other hand sequence "Akiyo" show strong spatial homogeneity and low detail. Therefore, the time saving of this sequence is not much as compared to other sequences. FIG. 12 also indicates that percentage of complexity reduction is decreased with increasing the QP values. This is because there is large number of non-zero coefficients at small QP values. If true encoding process is used large entropy coding time is spent at small QP values whereas in our proposed method no entropy coding is required during mode-decision process.

Experiment 2

On IPP Sequence

Figure 13:
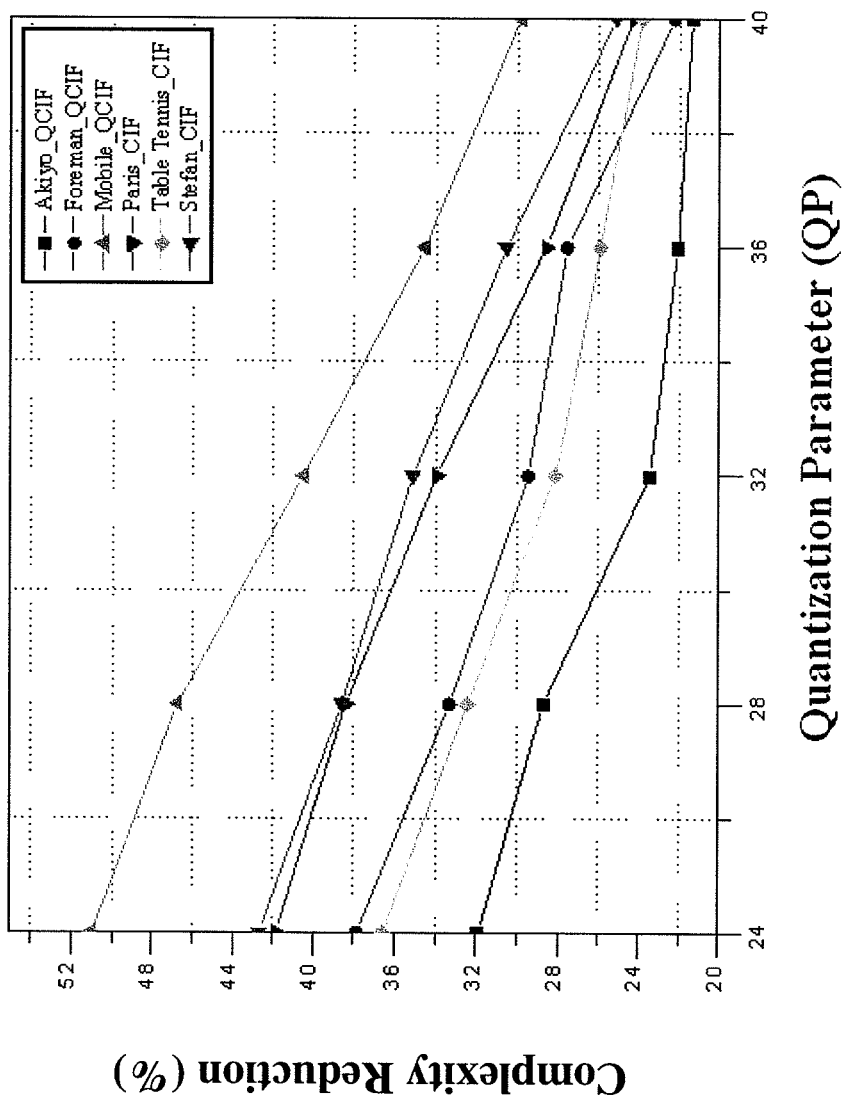
FIG. 13 is a graphical illustration showing complexity reduction of different sequences during Inter frame coding.
Figure 14A:
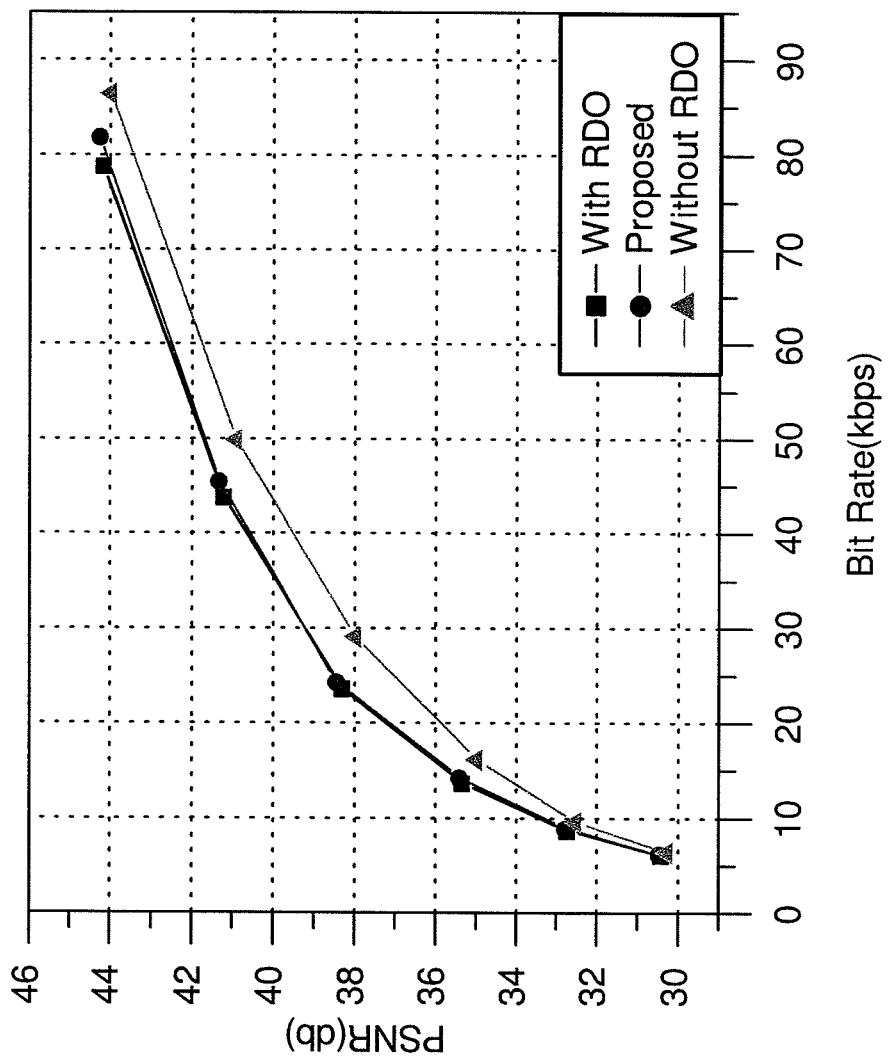
FIG. 14 is a graphical illustration of rate distortion performance of proposed method with IBPBP sequences.
Figure 14B:
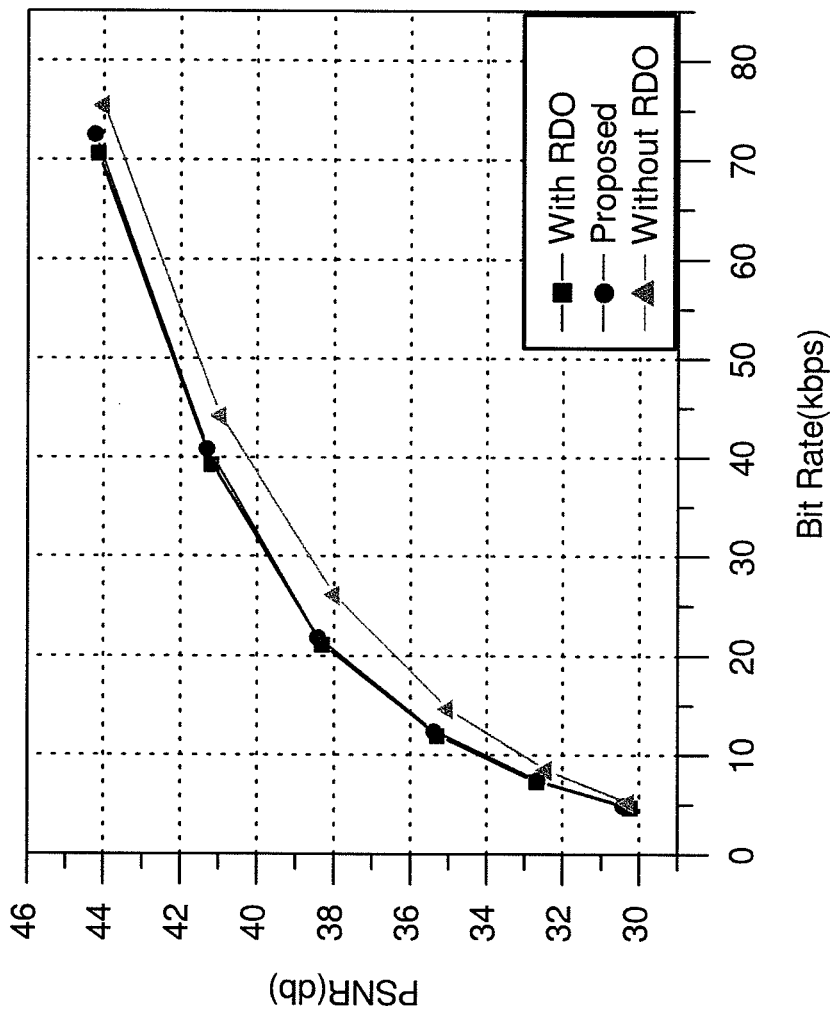
Figure 14C:
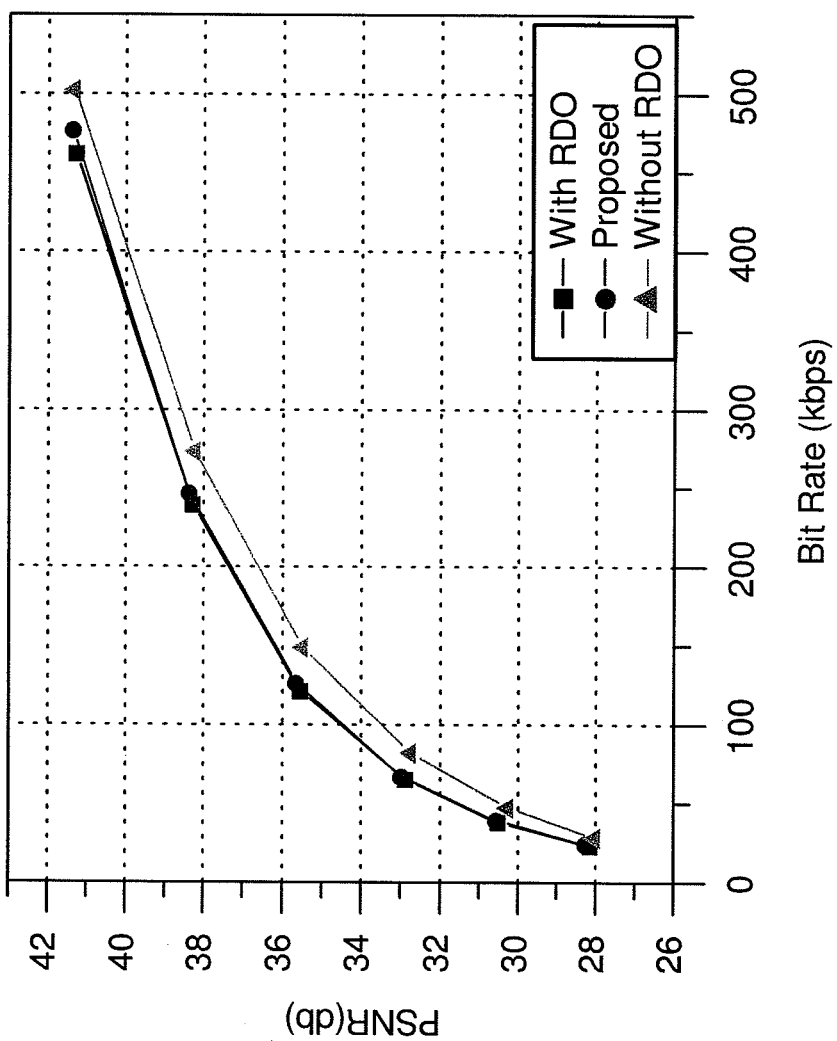
Figure 14D:
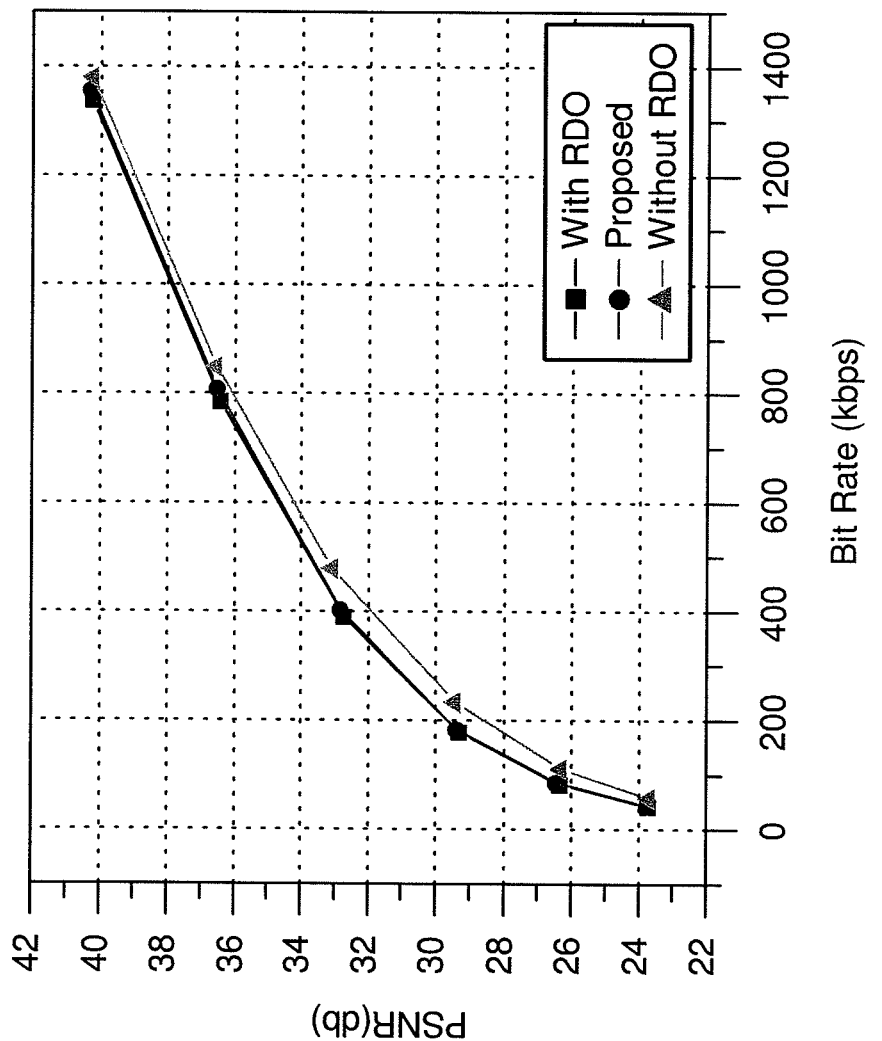

To evaluate the performance of proposed method during inter frame coding, several test video sequences are used. In this experiment total number of frames is 100 for each sequence, and the period of I-frame is 3. FIG. 10 shows the actual and predicted rates of foreman and Stefan at different QP values. Data is generated as similar ways of intra frame coding. Experimental results are tabulated as Table IV, which means that PSNR increments and bit rate reduction is negligible. The positive values mean increments whereas negative values mean decrements. From the experimental results in Table V, it is observed that the proposed approach has reduced the encoding time by 34% on average. FIG. 13 presents the plot of computational complexity with quantization parameter of different sequences. FIG. 13 shows the general tendency that time saving increases as QP decreases. This is understandable that at small QP, coding quality is high and many detailed are retained. From this figure it is also shown that computation saving is large for those sequences which have high motion and large detail.

Experiment 3

On IBPBP Sequence

In this experiment, there is one B-frame between any two I- or P-frames with different frame skip values. Period of I-frames is set to 100. Number of frames is 100. Experimental results were tabulated at table VI. As shown in table VI, the proposed algorithm achieves time saving of about 32% (on average) with slight increment in bit rate. Rate-distortion performances of different sequences are shown in FIG. 14 with different frame skip value.

Experiment 4

With Full Search Motion Estimation

It is well known that motion estimation requires major portion of the processing power. In all of the previous experiments a fast motion estimation technique is utilized. In order to show the complexity of proposed method with full search motion estimation technique, several video sequences are encoded. In this experiment, IPP sequence is used and number of frames is set to 50. Experimental results are tabulated at table VII. It is shown that bit rate increment is up to about 4%. Since the PSNR also increases, the resulting RD performance is very much closed with original one. The proposed algorithm reduces about 17% (on average) of computation time when full search motion estimation method is used.

It should be appreciated that modifications and alternations obvious to those skilled in the art are not to be considered as beyond the scope of the present invention.

TABLE I

Example of CAVLC

| Element | Value | Code |
|---|---|---|
| coeff token | TotalCoeffs = 6, T1s = 3 (use VLC0) | 00000100 |
| T1 sign (5) | + | 0 |
| T1 sign (4) | − | 1 |
| T1 sign (3) | + | 0 |
| Level (2) | +1 (use Level_VLC0) | 1 |
| Level (1) | −2 (use Level_VLC1) | 011 |
| Level (0) | +4 (use Level_VLC1) | 00010 |
| TotalZeros | 2 | 111 |
| run_before(5) | ZerosLeft = 2; run_before = 0 | 1 |
| run_before(4) | ZerosLeft = 2; run_before = 0 | 1 |
| run_before(3) | ZerosLeft = 2; run_before = 1 | 01 |
| run_before(2) | ZerosLeft = 1; run_before = 1 | 0 |
| run_before(1 & 0) | ZerosLeft = 0; run_before = 0 | No code required |

TABLE II

Performance of PSNR and Bit Rate of Proposed Algorithm while all frames are intra coded

| Sequence | QP | Δ $P_{snr}$ | Δ Bit % |
|---|---|---|---|
| Akiyo (QCIF) | 20 | −0.06 | +0.64 |
| | 24 | −0.05 | +0.50 |
| | 28 | +0.02 | +0.53 |
| | 32 | +0.17 | +0.70 |
| | 36 | +0.12 | +1.49 |
| | 40 | +0.16 | +2.59 |
| Foreman (QCIF) | 20 | −0.06 | +0.49 |
| | 24 | −0.05 | +0.89 |
| | 28 | −0.02 | +1.16 |
| | 32 | +0.10 | +1.75 |
| | 36 | +0.11 | +2.35 |
| | 40 | +0.15 | +3.86 |
| Mobile (QCIF) | 20 | −0.16 | +0.85 |
| | 24 | −0.09 | +0.78 |
| | 28 | −0.10 | +0.54 |
| | 32 | −0.08 | +0.27 |
| | 36 | −0.06 | +0.70 |
| | 40 | +0.03 | +1.83 |
| Paris (CIF) | 20 | −0.16 | +0.46 |
| | 24 | −0.11 | +0.25 |
| | 28 | −0.10 | +0.45 |
| | 32 | −0.06 | +0.88 |
| | 36 | −0.02 | +0.64 |
| | 40 | +0.04 | +1.61 |
| Table Tennis (CIF) | 20 | −0.14 | +0.31 |
| | 24 | −0.12 | +0.36 |
| | 28 | −0.04 | +1.01 |
| | 32 | +0.01 | +0.88 |
| | 36 | +0.02 | +1.48 |
| | 40 | +0.06 | +2.23 |
| Stefan (CIF) | 20 | −0.19 | +0.62 |
| | 24 | −0.12 | +0.44 |
| | 28 | −0.11 | +0.42 |
| | 32 | −0.02 | +0.68 |
| | 36 | −0.02 | +1.69 |
| | 40 | +0.13 | +3.15 |

TABLE III

Computational complexity reduction of proposed algorithm while all frames are intra coded

| | Quantization Parameter, QP | | | | | |
|---|---|---|---|---|---|---|
| Sequence | 20 | 24 | 28 | 32 | 36 | 40 |
| Akiyo_QCIF | 51.21% | 47.29% | 44.11% | 39.34% | 35.35% | 30.42% |
| Foreman_QCIF | 55.20% | 51.16% | 46.66% | 42.42% | 37.28% | 33.33% |
| Mobile_QCIF | 62.87% | 61.78% | 59.45% | 57.14% | 51.21% | 47.14% |
| Paris_CIF | 58.11% | 54.96% | 52.81% | 47.94% | 43.30% | 41.08% |
| Table_tennis_CIF | 57.04% | 53.56% | 49.54% | 43.41% | 39.11% | 35.21% |
| Stefan_CIF | 57.41% | 54.12% | 50.55% | 44.96% | 39.20% | 34.52% |
| | | | Average = 47.36% | | | |

TABLE IV

Performance of PSNR and Bit Rate of Proposed Algorithm of Inter frame (IPP sequences) coding

| Sequence | QP | Δ $P_{snr}$ | Δ Bit % |
|---|---|---|---|
| Akiyo (QCIF) | 20 | +0.01 | +1.47 |
| | 24 | +0.01 | +1.38 |
| | 28 | +0.09 | +1.97 |
| | 32 | +0.14 | +2.79 |
| | 36 | +0.11 | +3.00 |
| | 40 | +0.16 | +2.89 |
| Foreman (QCIF) | 20 | +0.02 | +2.12 |
| | 24 | +0.03 | +2.23 |
| | 28 | +0.05 | +2.57 |
| | 32 | +0.07 | +3.01 |
| | 36 | +0.13 | +3.05 |
| | 40 | +0.15 | +4.44 |

TABLE IV-continued

Performance of PSNR and Bit Rate of Proposed Algorithm of Inter frame (IPP sequences) coding

| Sequence | QP | Δ $P_{snr}$ | Δ Bit % |
|---|---|---|---|
| Mobile (QCIF) | 20 | −0.05 | +0.95 |
|  | 24 | −0.04 | +0.99 |
|  | 28 | −0.03 | +1.17 |
|  | 32 | −0.01 | +2.39 |
|  | 36 | +0.02 | +2.89 |
|  | 40 | +0.07 | +2.94 |
| Paris (CIF) | 20 | −0.05 | +1.17 |
|  | 24 | −0.05 | +1.37 |
|  | 28 | −0.02 | +1.43 |
|  | 32 | +0.00 | +2.38 |
|  | 36 | +0.02 | +2.33 |
|  | 40 | +0.08 | +3.21 |
| Table Tennis (CIF) | 20 | −0.03 | +2.20 |
|  | 24 | +0.01 | +2.33 |
|  | 28 | +0.04 | +2.52 |
|  | 32 | +0.06 | +2.88 |
|  | 36 | +0.06 | +2.95 |
|  | 40 | +0.06 | +3.11 |
| Stefan (CIF) | 20 | −0.10 | +1.17 |
|  | 24 | −0.09 | +0.08 |
|  | 28 | −0.03 | +1.97 |
|  | 32 | −0.02 | +3.01 |
|  | 36 | +0.07 | +3.65 |
|  | 40 | +0.14 | +4.74 |

TABLE V

Computational complexity reduction of proposed algorithm during Inter frame (IPP sequences) coding

| Sequence | Quantization Parameter, QP | | | | | |
|---|---|---|---|---|---|---|
|  | 20 | 24 | 28 | 32 | 36 | 40 |
| Akiyo_QCIF | 36.63% | 31.91% | 28.73% | 23.45% | 22.07% | 21.33% |
| Foreman_QCIF | 41.66% | 37.85% | 33.33% | 29.47% | 27.58% | 22.22% |
| Mobile_QCIF | 53.08% | 50.99% | 46.71% | 40.49% | 34.57% | 29.89% |
| Paris_CIF | 45.15% | 41.82% | 38.39% | 33.98% | 28.64% | 24.29% |
| Table_tennis_CIF | 41.61% | 36.59% | 32.45% | 28.16% | 25.94% | 23.87% |
| Stefan_CIF | 46.19% | 42.65% | 38.61% | 35.13% | 30.56% | 25.14% |

Average = 34.20%

TABLE VI

Experimental results of IBPBP sequences

| Sequence | Frame Skip | QP | Δ $P_{snr}$ | Δ Bit % | Δ T % |
|---|---|---|---|---|---|
| Akiyo (QCIF) | 1 | 20 | +0.09 | +3.84 | 30.41 |
|  |  | 28 | +0.14 | +3.00 | 20.84 |
|  |  | 32 | +0.06 | +3.02 | 17.76 |
|  | 2 | 20 | +0.11 | +2.85 | 33.20 |
|  |  | 28 | +0.14 | +3.55 | 25.99 |
|  |  | 32 | +0.10 | +3.67 | 20.46 |
| Foreman (QCIF) | 1 | 20 | +0.09 | +3.24 | 36.86 |
|  |  | 28 | +0.11 | +3.96 | 29.60 |
|  |  | 32 | +0.10 | +2.98 | 23.88 |
|  | 2 | 20 | +0.06 | +2.03 | 34.51 |
|  |  | 28 | +0.10 | +4.13 | 26.25 |
|  |  | 32 | +0.13 | +4.41 | 20.27 |
| Mobile (QCIF) | 1 | 20 | +0.01 | +3.04 | 46.26 |
|  |  | 28 | +0.11 | +2.82 | 39.67 |
|  |  | 32 | +0.08 | +3.33 | 35.35 |
|  | 2 | 20 | +0.04 | +1.60 | 47.46 |
|  |  | 28 | +0.11 | +3.10 | 40.06 |
|  |  | 32 | +0.08 | +2.87 | 36.51 |

TABLE VII

Experimental results with full search motion estimation

| Sequence | QP | Δ $P_{snr}$ | Δ Bit % | Δ T % |
|---|---|---|---|---|
| Akiyo (QCIF) | 20 | +0.09 | +3.96 | 12.53 |
|  | 28 | +0.12 | +2.94 | 6.66 |
|  | 32 | +0.13 | +3.65 | 5.72 |
| Foreman (QCIF) | 20 | +0.07 | +2.86 | 20.66 |
|  | 28 | +0.04 | +3.59 | 9.09 |
|  | 32 | +0.08 | +3.50 | 6.62 |
| Mobile (QCIF) | 20 | −0.01 | +0.64 | 32.19 |
|  | 28 | +0.11 | +2.52 | 24.42 |
|  | 32 | +0.10 | +4.21 | 21.95 |
| Stefan (QCIF) | 20 | +0.02 | +1.48 | 24.80 |
|  | 28 | +0.07 | +2.46 | 20.11 |
|  | 32 | +0.08 | +2.57 | 15.78 |

TABLE VIII

Comparison of proposed method with rate estimation method stated in [9]

| Sequence | QP | Δ $P_{snr}$ | Δ Bit % | Δ T % |
|---|---|---|---|---|
| Akiyo (QCIF) | 20 | +0.02 | −0.91 | −4.11 |
|  | 28 | +0.01 | −1.38 | −4.54 |
|  | 32 | +0.05 | −1.47 | −4.02 |
| Foreman (QCIF) | 20 | +0.05 | −1.14 | −4.47 |
|  | 28 | +0.07 | −0.77 | −4.61 |
|  | 32 | +0.11 | −0.67 | −4.68 |
| Mobile (QCIF) | 20 | +0.22 | −0.29 | −5.86 |
|  | 28 | +0.13 | −0.78 | −5.17 |
|  | 32 | +0.06 | −1.02 | −5.02 |
| Stefan (CIF) | 20 | +0.33 | −0.52 | −5.59 |
|  | 28 | +0.10 | −0.88 | −5.12 |
|  | 32 | +0.11 | −1.23 | −4.92 |

TABLE IX

Comparison of proposed method with fast inter mode decision stated in [16]

| Sequence | QP | Δ $P_{snr}$ | Δ Bit % | Δ T % |
|---|---|---|---|---|
| Akiyo (QCIF) | 20 | +0.05 | −0.24 | −10.71 |
|  | 28 | +0.21 | −0.11 | −6.56 |
|  | 32 | +0.15 | −0.67 | −4.16 |

TABLE IX-continued

Comparison of proposed method with fast inter mode decision stated in [16]

| Sequence | QP | $\Delta P_{snr}$ | $\Delta$ Bit % | $\Delta$ T % |
|---|---|---|---|---|
| Foreman | 20 | +0.10 | −0.49 | 9.09 |
| (QCIF) | 28 | +0.11 | −0.95 | 7.93 |
|  | 32 | +0.12 | −1.48 | 6.12 |
| Mobile | 20 | +0.03 | −0.39 | 31.53 |
| (QCIF) | 28 | +0.05 | −0.42 | 21.50 |
|  | 32 | +0.04 | −0.84 | 14.28 |
| Stefan | 20 | +0.08 | −0.35 | 19.60 |
| (CIF) | 28 | +0.04 | −0.60 | 10.94 |
|  | 32 | +0.09 | −1.03 | 8.34 |

The invention claimed is:

1. A method of transmitting compressed data at a minimized bit rate over a network, the method comprising:
estimating a minimized bit rate required for compressing the data using an encoding scheme comprising
predicting bit rates of each of a plurality of symbols of the encoding scheme, without compressing the data to be compressed, based on characteristics of the data and codes of the encoding scheme, and
computing a computed bit rate required for compressing the data by summing the bit rates predicted for each of the symbols;
compressing the data using the computed bit rate to produce compressed data; and
transmitting the compressed data to a network.

2. The method of claim 1, wherein the encoding scheme is variable length coding.

3. The method of claim 2, wherein the encoding scheme is context adaptive variable length coding.

4. The method of claim 3, wherein the plurality of symbols of the encoding scheme include coefficient tokens, trailing ones, level of nonzero coefficients, total number of zeros before the last coefficient, and runs of non-zero coefficients.

5. The method of claim 1 including processing the data with at least one of a transform and quantization before predicting the bit rates of each of the plurality of symbols.

6. The method of claim 1, including predicting the bit rates of each of the plurality of symbols iteratively to determine optimized parameters for compressing the data.

7. The method of claim 1, including predicting the bit rates of each of the plurality of symbols iteratively to determine optimized mode for compressing video frames as the data.

8. A method of transmitting compressed video data over a network, the method comprising:
determining an optimum mode for compressing video data comprising
finding difference image data of a selected block of a video frame using a predictive mode,
transforming and quantizing the difference image data to produce quantized data,
estimating a minimized bit rate required for compressing the quantized data using an encoding scheme, wherein estimating the minimized bit rate includes
predicting bit rates of each of a plurality of symbols of the encoding scheme, without compressing the quantized data to be compressed, based on characteristics of the quantized data and codes of the encoding scheme, and
computing a computed bit rate by summing the bit rates predicted for each of the symbols;
iteratively repeating the foregoing steps, using different predictive modes, until an optimum mode for compressing the video data is found;
compressing the video data using the optimized mode to produce compressed video data; and
transmitting the compressed video data to a network.

9. The method of claim 8, wherein the predictive modes are based on intra and inter mode video data compression.

10. The method of claim 8, wherein the encoding scheme is variable length coding.

11. The method of claim 10, wherein the encoding scheme is context adaptive variable length coding.

12. The method of claim 11, including estimating the bit rate based, in part, on at least one symbol code of context adaptive variable length coding.

13. The method of claim 8, including compressing the video data according to one of MPEG4 Part2 and ITU-T H.264.

14. The method of claim 11, wherein the plurality of symbols of the encoding scheme include coefficient tokens, trailing ones, level of nonzero coefficients, total number of zeros before the last coefficient, and runs of non-zero coefficients.

* * * * *